US008228316B2

(12) United States Patent
Yamada

(10) Patent No.: US 8,228,316 B2
(45) Date of Patent: Jul. 24, 2012

(54) VIDEO SIGNAL PROCESSING APPARATUS AND VIDEO SIGNAL PROCESSING METHOD

(75) Inventor: Kazuhiro Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 450 days.

(21) Appl. No.: 11/666,136

(22) PCT Filed: Sep. 7, 2006

(86) PCT No.: PCT/JP2006/317726
§ 371 (c)(1), (2), (4) Date: Apr. 24, 2007

(87) PCT Pub. No.: WO2007/029762
PCT Pub. Date: Mar. 15, 2007

(65) Prior Publication Data

US 2008/0122738 A1 May 29, 2008

(30) Foreign Application Priority Data

Sep. 7, 2005 (JP) ................................ 2005-258809

(51) Int. Cl.
*G06F 3/038* (2006.01)

(52) U.S. Cl. ............... 345/204; 345/30; 345/60; 345/76

(58) Field of Classification Search .............. 345/76-84, 345/30, 204
See application file for complete search history.

(56) References Cited

U.S. PATENT DOCUMENTS

| | | | | |
|---|---|---|---|---|
| 6,144,364 | A | 11/2000 | Otobe et al. | |
| 6,310,588 | B1 | 10/2001 | Kawahara et al. | |
| 6,417,835 | B1 | 7/2002 | Otobe et al. | |
| 6,456,302 | B2 | 9/2002 | Kawahara et al. | |
| 6,563,486 | B2 | 5/2003 | Otobe et al. | |
| 6,987,521 | B2 * | 1/2006 | Mori et al. | 345/690 |
| 7,071,902 | B1 | 7/2006 | Kawahara | |
| 7,095,390 | B2 | 8/2006 | Otobe et al. | |
| 7,119,766 | B2 | 10/2006 | Otobe et al. | |
| 7,209,152 | B2 | 4/2007 | Chiaki et al. | |
| 7,280,705 | B1 * | 10/2007 | Frank et al. | 382/274 |
| 7,855,698 | B2 | 12/2010 | Otobe et al. | |
| 2001/0028347 | A1 | 10/2001 | Kawahara et al. | |
| 2001/0045923 | A1 | 11/2001 | Otobe et al. | |
| 2002/0130826 | A1 | 9/2002 | Otobe et al. | |
| 2004/0263434 | A1 | 12/2004 | Otobe et al. | |
| 2004/0263539 | A1 | 12/2004 | Chiaki et al. | |
| 2005/0140583 | A1 * | 6/2005 | Myoung et al. | 345/60 |
| 2005/0168490 | A1 * | 8/2005 | Takahara | 345/690 |
| 2006/0279482 | A1 | 12/2006 | Otobe et al. | |

FOREIGN PATENT DOCUMENTS

JP 10-31455 2/1998

(Continued)

*Primary Examiner* — Alexander Eisen
*Assistant Examiner* — Christopher E Leiby
(74) *Attorney, Agent, or Firm* — Wenderoth, Lind & Ponack, L.L.P.

(57) ABSTRACT

There is provided a video signal processing apparatus including motion picture region detecting, transition region generating unit, still level delay unit which delays the output from the transition region generating unit for output, addition unit which adds an error diffused from neighboring pixels to a video signal, still image processing unit which performs a still image process on a video signal, motion picture processing unit which performs a motion picture process on a video signal, selection unit which outputs a video signal on which the still image process has been performed or a video signal on which the motion picture process has been performed, subtraction unit which calculates a difference between an input video signal and an output video signal, multiplication unit which multiplies an error by a predetermined constant, and a delay unit which delays the error and diffuses the error to neighboring pixels.

4 Claims, 16 Drawing Sheets

FOREIGN PATENT DOCUMENTS

| | | |
|---|---|---|
| JP | 10-39830 | 2/1998 |
| JP | 10-207425 | 8/1998 |
| JP | 11-212517 | 8/1999 |
| JP | 11-231827 | 8/1999 |
| JP | 11-231831 | 8/1999 |
| JP | 2000-276100 | 10/2000 |
| JP | 2001-034229 | 2/2001 |
| JP | 2003-069922 | 3/2003 |
| JP | 2004-326029 | 11/2004 |
| JP | 2005-24684 | 1/2005 |
| JP | 2005-24708 | 1/2005 |

* cited by examiner

FIG. 13 – PRIOR ART
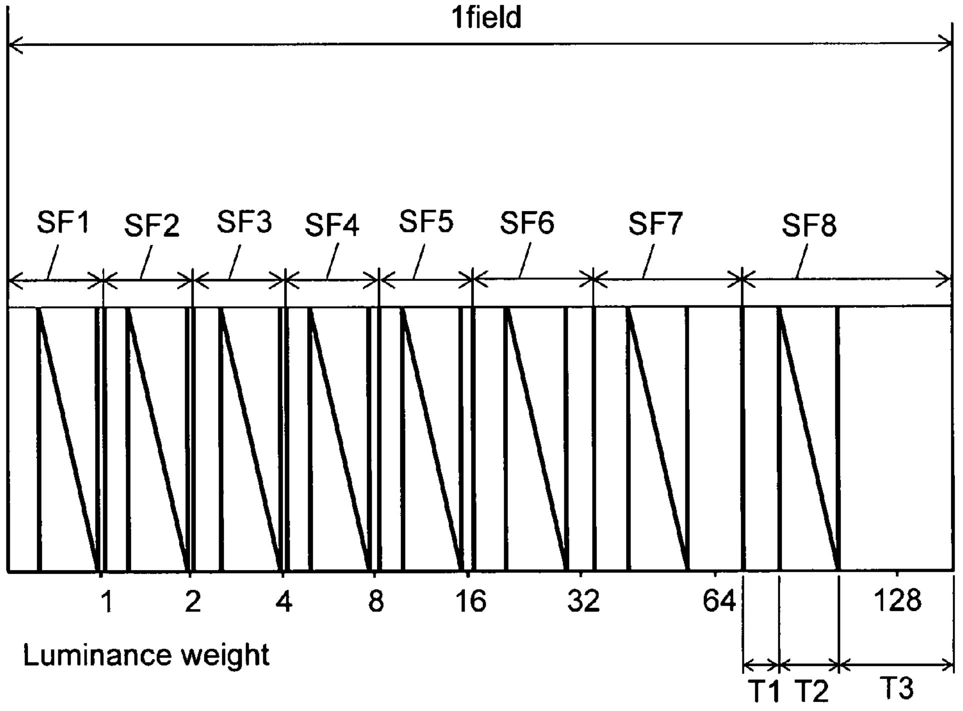

FIG. 14 – PRIOR ART
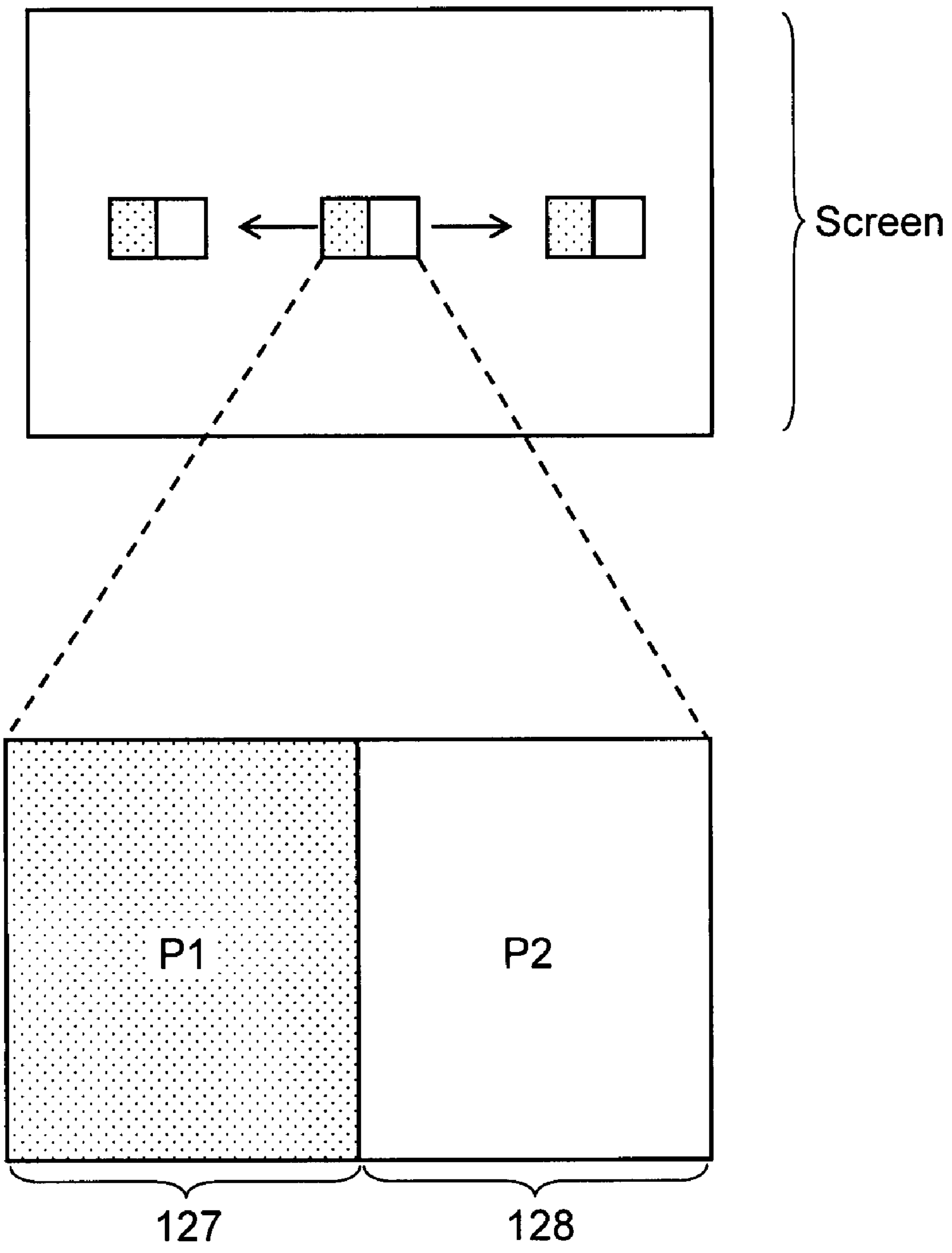

FIG. 15 – PRIOR ART
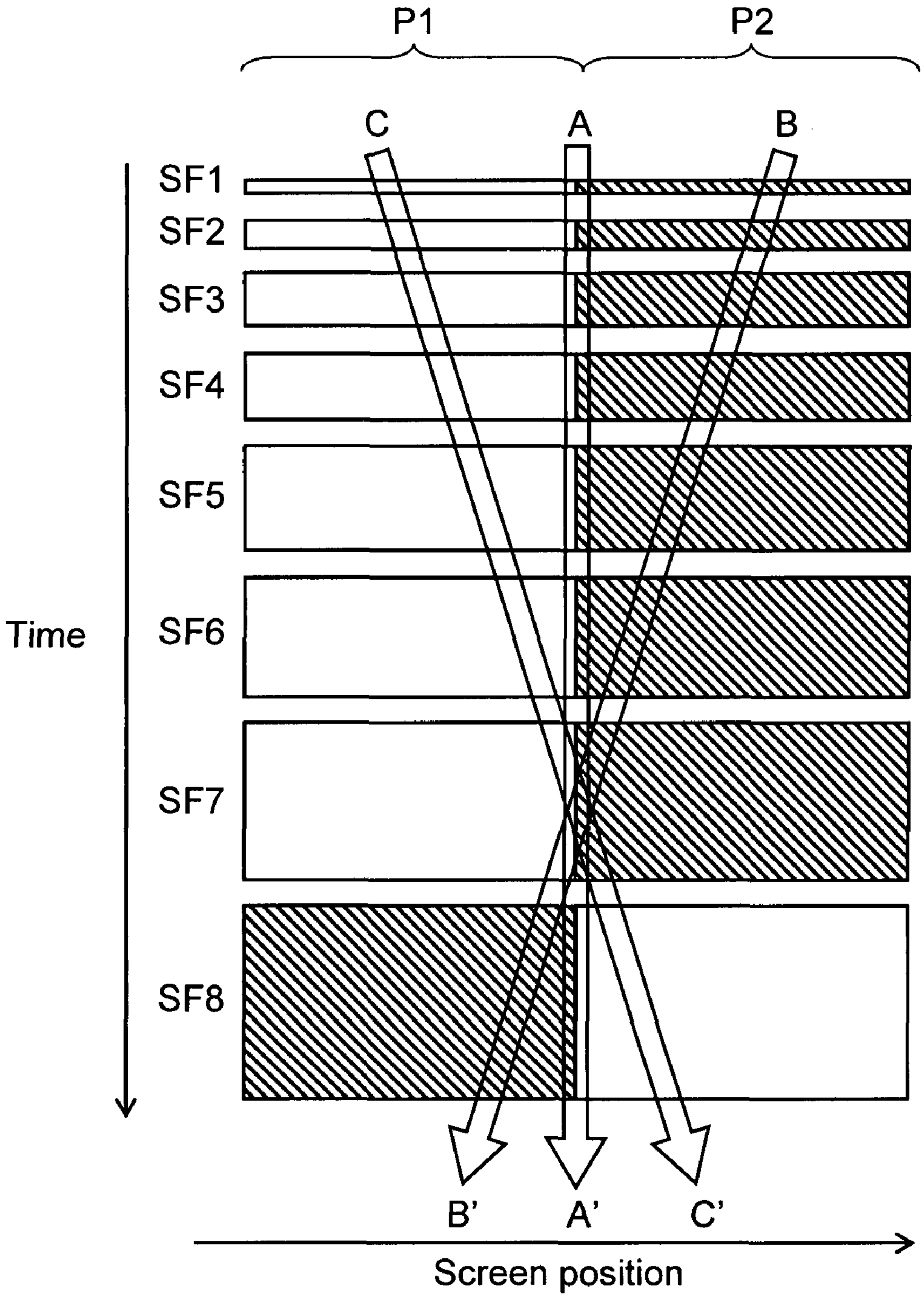

FIG. 16 – PRIOR ART
| | | | | | | | | | | |
|---|---|---|---|---|---|---|---|---|---|---|
| | | 1 | 2 | 3 | 4 | 5 | 6 | 7 | 8 | SF |
| | | 1 | 2 | 4 | 8 | 16 | 32 | 64 | 128 | Luminance depth |
| Gradation levels for which dynamic false contour is difficult to occur | 0 | | | | | | | | | |
| | 1 | O | | | | | | | | |
| | 3 | O | O | | | | | | | |
| | 7 | O | O | O | | | | | | |
| | 15 | O | O | O | O | | | | | |
| | 31 | O | O | O | O | O | | | | |
| | 63 | O | O | O | O | O | O | | | |
| | 127 | O | O | O | O | O | O | O | | |
| | 255 | O | O | O | O | O | O | O | O | |
O : Light-emitting subfield
FIG. 17 – PRIOR ART
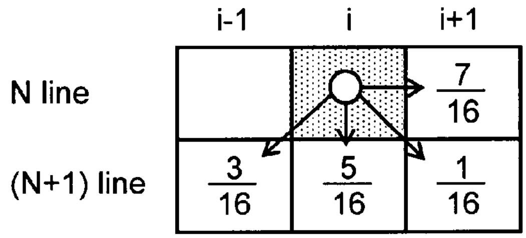
○ : Error (Display gradation level – original gradation level)

VIDEO SIGNAL PROCESSING APPARATUS AND VIDEO SIGNAL PROCESSING METHOD

This application is a U.S. national phase application of PCT International Application PCT/JP2006/317726, filed Sep. 7, 2006.

TECHNICAL FIELD

The present invention relates to a video signal processing apparatus and a video signal processing method in an image display apparatus and image display method such as a plasma display panel (PDP) or a digital mirror device (DMD) performing multi-level gradation display by dividing an image of one field into a plurality of subfields of images.

BACKGROUND ART

An image display apparatus such as the PDP or the DMD, which performs a binary control of light emission and non-light emission, typically uses a method in which multi-level gradations are displayed by dividing an image of one field into images of a plurality of subfields, so called a subfield method. In the subfield method, a period of one field is divided into a plurality of subfields weighted with the number of light emission or the amount of light emission by temporal decomposition, the display of a gradation level is performed by the combination of subfields to be emitted.

FIG. 13 is a schematic view showing an example of configuration of a subfield in the PDP. In this example shown in FIG. 13, a single field is divided into eight subfields (SF1, SF2, . . . , and SF8), wherein respective subfields have luminance weights (1, 2, 4, 8, 16, 32, 64, and 128). Each subfield is composed of setup period (T1) for preliminary discharge, writing period (T2) during which data for light emission or non-emission is written for each pixel, and sustain period (T3) during which pixels with light-emitting data being written are made to emit light all at once. Combining these subfields for emitting light can produces 256 gradation levels of "0" level through "255" level. For example, gradation level "7" is presented by emitting SF1, SF2, and SF3 having luminance weights 1, 2, and 4, respectively, and a gradation level "21" is presented by emitting SF1, SF3, and SF5 having luminance weights 1, 4, and 16, respectively.

In such a display method that uses the subfield method for displaying multi-level gradation, it is known that a case where the deterioration of image quality is observed while motion pictures are displayed occurs. False contours (dynamic false contours) are one of the reasons for the deterioration of image quality. The dynamic false contours are described hereinafter for an exemplary case where a single field is divided into eight subfields (SF1, SF2, . . . , and SF8) respectively luminance-weighted with (1, 2, 4, 8, 16, 32, 64, and 128).

FIG. 14 is a schematic view showing an example of an image pattern moving on the screen of the PDP horizontally. The image pattern shown in FIG. 14 has region P1 with gradation level "127" and region P2 with gradation level "128", and moves horizontally to the left-to-right direction or the right-to-left direction on the screen of the PDP. FIG. 15 is a schematic diagram in which the image pattern shown in FIG. 14 is expanded to subfields. In FIG. 15, a horizontal axis corresponds to a horizontal position on the screen of the PDP, and a vertical axis corresponds to a time direction. In addition, hatched subfields represent non-emission subfields.

When the image pattern remains stationary, and a viewer's viewpoint is also fixed to screen position A rather than moving in a horizontal direction, as shown in an arrow A-A' of FIG. 15, the viewer can perceive region P1 and region P2 as regions having the gradation levels "127" and "128," respectively, which are original gradation levels.

However, when the image pattern moves in a right-to-left direction on the screen of the PDP and the viewer follows the movement of the image pattern to move the viewpoint to the direction of arrow B-B', there is a case where the non light-emitting subfields in region P2 (SF1 to SF7 in region P2) and the non light-emitting subfields in region P1 (SF8 in region P1) are viewed as a continuous pattern by the viewer. In the case, subfields SF1 to SF8 are perceived as continuous non light-emitting subfields by the viewer, and consequently, gradation level "0", that is, a dark line is perceived.

To the contrary, when the image pattern moves in a left-to-right direction on the screen of the PDP and the viewer follows the movement of the image pattern to move the viewpoint in a direction of an arrow C-C', there is a case where the light-emitting subfields in region P1 (SF1 to SF7 in region P1) and the light-emitting subfields in region P2 (SF8 in region P2) are viewed as a continuous pattern by the viewer. In the case, subfields SF1 to SF8 are perceived as continuous light-emitting subfields by the viewer, and consequently, gradation level "255", that is, a bright line is viewed. In any of the cases described above, a region of gradation level which is considerably different from the original gradation levels "127" and "128" is viewed as if the region exists on the screen of the PDP. The region is a false contour which occurs during displaying a motion picture, that is, a dynamic false contour, and the dynamic false contour is one of the reasons for deterioration of image quality.

As is clear from the principle of occurrence of the dynamic false contour described with reference to FIG. 15, dynamic contours may easily occur in a case where the pattern of light-emitting subfields markedly changes in spite of small change in gradation levels. For example, when weighted subfields as described above are used, the false contour may be easily observed in a case where the luminance gradation levels of the adjacent pixels are "63" (SF1 to SF6 are light-emitting subfields) and "64" (SF7 is a light-emitting subfield), "191" (SF1 to SF6 and SF8 are light-emitting subfields) and "192" (SF7 and SF8 are light emitting subfields), or the like, since the pattern of light-emitting subfields markedly changes in spite of small change in gradation levels.

As a technology for suppressing the dynamic false contours, a method of converting a gradation level of a video signal to be displayed into a gradation level for which the dynamic false contour is difficult to occur is proposed. In this method, at first, a motion picture region of an image (hereinafter, an image region in which movement occurs between frames or fields is simply referred to a motion picture region, and an image region in which movement does not occur between frames or fields is simply referred to as a still image region) is detected by calculating a difference between frames or fields of a video signal or the like. For a region determined to be a still image region, an original gradation level is used for display (hereinafter, a process of a video signal in the still image region is simply referred to as a still image process), and for a region determined to be a motion picture region, an original gradation level is converted into a value for which the dynamic false contour is difficult to occur for display (hereinafter, a process of a video signal in the motion picture region is simply referred to as a motion picture process).

FIG. 16 is a table showing an example of gradation levels for which the dynamic false contour is difficult to occur. For example, when a single field is divided into eight subfields (SF1, SF2, . . . , and SF8) having luminance weights of (1, 2, 4, 8, 16, 32, 64, and 128), gradation levels (hereinafter, simply referred to as gradation levels for motion picture display) for which the dynamic false contour is difficult to occur are "0", "1" (light-emitting subfield is SF1), "3" (light-emitting subfields are SF1 and SF2), "7" (light-emitting subfields are SF1 to SF3), "15" (light-emitting subfields are SF1 to SF4), "31" (light-emitting subfields are SF1 to SF5), "63" (light-emitting subfields are SF1 to SF6), "127" (light-emitting subfields are SF1 to SF7), and "255" (light-emitting subfields are SF1 to SF8). As in a case where the light-emitting subfield is "0", or the gradation levels are "1", "3", "7", "15", "31", "63", "127", and "255", when light-emitting subfields display an image using successive gradation levels from a subfield which has a least luminance weight, a change in the pattern of the light-emitting subfields between adjacent pixels can be suppressed to be small, and accordingly the occurrence of the dynamic false contour can be suppressed.

However, in this method, when compared with a case where a still image region is displayed with 256 gradation levels of "0" level to "255" level, there are only nine motion picture gradation levels of "0", "1", "3", "7", "15", "31", "63", "127", "255" which can be used for a motion picture region. Therefore, a method of calculating an error generated in converting an original gradation level into a gradation level for motion picture display and diffusing the error to neighbor pixels, so called error diffusion is used simultaneously. By using the error diffusion, a difference between a gradation level used for display and an original gradation level is interpolated, and accordingly, the small number of gradation levels in the motion picture region can be supplemented.

FIG. 17 is a schematic diagram showing an example of the error diffusion. For example, when a i-th pixel of M-th line is converted into a gradation level for motion picture display (M and i are natural numbers), for example, when the original gradation level is "95", a gradation level for motion picture display which is the closest to "95" is "127", and accordingly, the gradation level of the M-th line and i-th pixel is converted into "127". At this time, since an error of "127−95=32" occurs, the error "32" is diffused to neighbor pixels. To be more specifically, a value equals to 7/16 times "32", that is, "32×7/16=14" is added to a gradation level of the adjacent (i+1)-th pixel of M-th line. Likewise, a value equals to 3/16 times "32", that is, "32×3/16=6" is added to a gradation level of the adjacent (i−1)-th pixel of (M+1)-th line, a value equals to 5/16 times "32", that is, "32×5/16=10" is added to a gradation level of the adjacent (M+1)-th line and i-th pixel, and a value equals to 1/16 times "32", that is, "32×1/16=2" is added to a gradation level of the adjacent (i+1)-th pixel of (M+1)-th line.

In addition, for a pixel to which the diffused error is added, a gradation level for motion picture display which is the closest to a result from the addition of a diffused error to the original gradation level is selected for a gradation level used for display, and the error occurs at that time is diffused to neighbor pixels as described above.

As described above, the dynamic false contour is decreased by using the gradation levels for motion picture display for the motion picture region and the reduction of the number of gradation levels for the motion picture region is suppressed by interpolating between a gradation level for display generated and the original gradation level using the error diffusion. The technology described above is disclosed in Japanese Patent Unexamined Publication No. 2000-276100.

However, a boundary between a region in which a motion picture process is performed and a region in which a still image process is performed is formed due to the switch of video signal processing methods between the motion picture region and the still image region, and there is a case where a noise (hereinafter, referred to as switching shock) in the shape of a sharp edge occurs in the boundary. Accordingly, a method of decreasing the switching shock by generating a random number and diffusing the boundary between the motion picture region and the still image region using the random number is, for example, proposed in Japanese Patent Unexamined Publication No. 2003-69922.

In the general technology described above, the switching shock can be decreased by randomly diffusing the boundary between a region in which a motion picture process is performed and a region in which a still image process is performed, using a random number. However, there is a case where a noise in the shape of a sharp edge is left as a dull noise having a fixed width due to randomly diffusing the boundary between a region in which a motion picture process is performed and a region in which a still image process is performed up to the fixed width, and accordingly, the effect of the decrease of the switching shock is not sufficient.

DISCLOSURE OF THE INVENTION

In order to solve the above-described problems, the present invention provides a video signal processing apparatus and a video signal processing method capable of improving the image quality in displaying a motion picture by decreasing a dynamic false contour and reducing the switching shock which occurs in the boundary of a motion picture region and a still image region by including a video signal on which a motion picture process has been performed and a video signal on which a still image process has been performed together in the boundary between the motion picture region and the still image region in an image display apparatus such as a PDP or a DMD which performs multi-gradation display by dividing one field of an image into a plurality of subfields of images.

According to an aspect of the present invention, there is provided a video signal processing apparatus used for an image display apparatus which constructs one field as a plurality of subfields having different luminance weightings and displays multi-gradations by controlling light-emitting or non light-emitting of each subfield, the video signal processing apparatus including a motion picture region detecting unit which detects a motion picture region from a video signal, a still image processing unit which performs a still image process on the video signal, a motion picture processing unit which performs a motion picture process on the video signal, a transition region generating unit that generates a still level for selecting a video signal on which the still image process has been performed or a video signal on which the motion picture process has been performed based on the result of the detection of the motion picture region detecting unit, a selection unit that selects the video signal on which the still image process has been performed or the video signal on which the motion picture process has been performed based on the still level and outputs the selected video signal, and a still level delay unit which outputs the still level output from the transition region generating unit with a delay by a predetermined time, wherein the transition region generating unit outputs an initial value set in advance as the still level in the motion picture region and outputs a value resulting from adding a correction value to an output from the still level delay unit as the still level as the still level in a region other than the motion picture region.

Since the video signal processing apparatus can generate a transition region in which a video signal on which a motion picture process has been performed and a video signal on which a still image process has been performed are mixed in the boundary between a motion picture region and a still image region, the switching shock which occurs in the boundary between the motion picture region and the still image region can be reduced, and accordingly, it becomes possible to improve the image quality in displaying a motion picture.

In the aspect above, the video signal processing apparatus may further include a random number generating unit which generates a random number, and the video signal on which the still image process has been performed or the video signal on which the motion picture process has been performed may be selected based on the result from comparing the random number generated by the random number generating unit to the still level and output the selected video signal. In this case, since the video signal on which the still image process has been performed and the video signal on which the motion picture process has been performed can be mixedly included in the transition region by comparing the generated random number to the still level, the video signals can be randomly mixed to further decrease the switching shock.

In addition, transition region generating unit may have a limiter for limiting a value of the still level to be output, and the random number generating unit may be configured to generate the random number in the range based on maximal and minimal values of the still level. In this case, retrospectively up to what time point information on the motion picture region is to be reflected on the transition region can be arbitrary set by a value of limiting the still level and the range of random numbers, and accordingly, the mixing ratio of a video signal on which the motion picture process has been performed and a video signal on which the still image process has been processed in the transition region can be easily changed.

In addition, the initial value in the transition region generating unit may be set to zero and the correction value may be set to one, and the selection unit may select the video signal on which the still image process has been performed to be output when the still level is greater than the generated random number and otherwise the selection unit may select the video signal on which the motion picture process has been performed to be output. In this case, setting random numbers generated by a random number generating unit and a value for limiting the still level in the limiter can be easily performed.

In addition, the video signal processing apparatus may further include a shrink unit which changes the still level of an arbitrary pixel to a maximal value when the still level of a pixel adjacent to the arbitrary pixel in a region other than the motion picture region is the maximal value. In this case, the longer time ago was a motion picture region detected, the more the transition region decreases to be able to increase the region on which the still image process is performed, and thus it becomes possible to make the boundary between the motion picture region and the still image region smoother to further decrease the switching shock, thereby capable of displaying a motion picture more smoothly.

According to another aspect of the present invention, there is provided a video signal processing method used for an image display apparatus which constructs one field as a plurality of subfields having different luminance weightings and displays multi-gradations by controlling light-emitting or non light-emitting of each subfield, the video signal processing method in which a motion picture region is generated from a video signal, a still level for selecting a video signal on which the still image process has been performed or a video signal on which the motion picture process has been performed is generated based on the result of the detection, the still level is configured to be an initial value set in advance in the motion picture region and the still level is configured to be a value resulting from adding a correction value to the still level delayed by a predetermined time, and a transition region in which a video signal on which the still image process has been performed and a video signal on which the motion picture process has been performed are mixed generated by selecting the video signal on which the still image process has been performed or the video signal on which the motion picture process has been performed based on the still level.

By using the video signal processing method, since the transition region including both a video signal on which the still image process has been performed and a video signal on which the motion picture process has been performed can be arranged to decrease the switching shock which occurs in the boundary of a motion picture region and a still image region, it becomes possible to improve the image quality in displaying a motion picture.

In addition, the video signal on which the still image process has been performed or the video signal on which the motion picture process has been performed may be selected based on the result from comparing a random number to the still level, the video signal on which the motion picture process has been performed may be selected when the still level is the initial value, and the probability of selecting the video signal on which the still image process has been performed is increased as the number of addition of the correction value to the still level increases. In this case, since the video signal on which the motion picture process has been performed and the video signal on which the still image process has been performed can be included together in the transition region by comparing the random number to the still level, the video signals can be randomly mixed, and the longer time ago was the motion picture region detected, the higher the mixing ratio of the video signal on which the still image process has been performed becomes by increasing the probability of selecting the video signal on which the still image process has been performed as the number of addition of the correction value to the still level increases, and accordingly it becomes possible to reduce the switching shock further.

According to an aspect of the present invention, a dynamic false contour can be decreased and the switching shock which occurs in the boundary of a motion picture region and a still image region can be reduced by including a video signal on which a motion picture process has been performed and a video signal on which a still image process has been performed together in the boundary between the motion picture region and the still image region in an image display apparatus such as a PDP or a DMD which performs multi-gradation display by dividing one field of an image into a plurality of subfields of images, and accordingly an image display apparatus capable of improving the image quality in displaying a motion picture can be provided.

BRIEF DESCRIPTION OF THE DRAWINGS

FIG. 13 is a schematic view showing an example of configuration of a subfield in the PDP.

FIG. 14 is a schematic view showing an example of an image pattern moving on the screen of the PDP horizontally.

FIG. 15 is a schematic diagram in which the image pattern shown in FIG. 14 is expanded to subfields.

FIG. 16 is a table showing an example of gradation levels for which the dynamic false contour is difficult to occur.

FIG. 17 is a schematic diagram showing an example of the error diffusion.

DESCRIPTION OF REFERENCE NUMERALS AND SIGNS

1: AD CONVERTER
2: VIDEO SIGNAL PROCESSING CIRCUIT
3: SUBFIELD PROCESSING CIRCUIT
4. DATA ELECTRODE DRIVING CIRCUIT
5: SCAN ELECTRODE DRIVING CIRCUIT
6: SUSTAIN ELECTRODE DRIVING CIRCUIT
10: PLASMA DISPLAY PANEL (PDP)
20: FRONT PANEL
21: IMAGE PROCESSOR
22: SCAN ELECTRODE
23: SUSTAIN ELECTRODE
24, 33: DIELECTRIC LAYER
25: PROTECTION LAYER
30: REAR PANEL
32: DATA ELECTRODE
34: PARTITION WALL
35: PHOSPHOR LAYER
102: MOTION PICTURE REGION DETECTING UNIT
103: STILL LEVEL DELAY UNIT
104, 302: SELECTOR
105: SHRINK SECTION
106, 114: ADDITION UNIT/SECTION
107: STILL IMAGE PROCESSING UNIT
108: MOTION PICTURE PROCESSING UNIT
110: SUBTRACTING UNIT
111: MULTIPLICATION UNIT
112: DELAY UNIT
115: LIMITER
200, 201: TRANSITION REGION GENERATING UNIT
300: SELECTION UNIT
301: SELECTION SIGNAL GENERATING SECTION
303: RANDOM NUMBER GENERATING PART
304: COMPARISON PART

PREFERRED EMBODIMENTS FOR CARRYING OUT THE INVENTION

Hereinafter, embodiments of the present invention will be described with reference to accompanying drawings.

Embodiment 1

Figure 1:
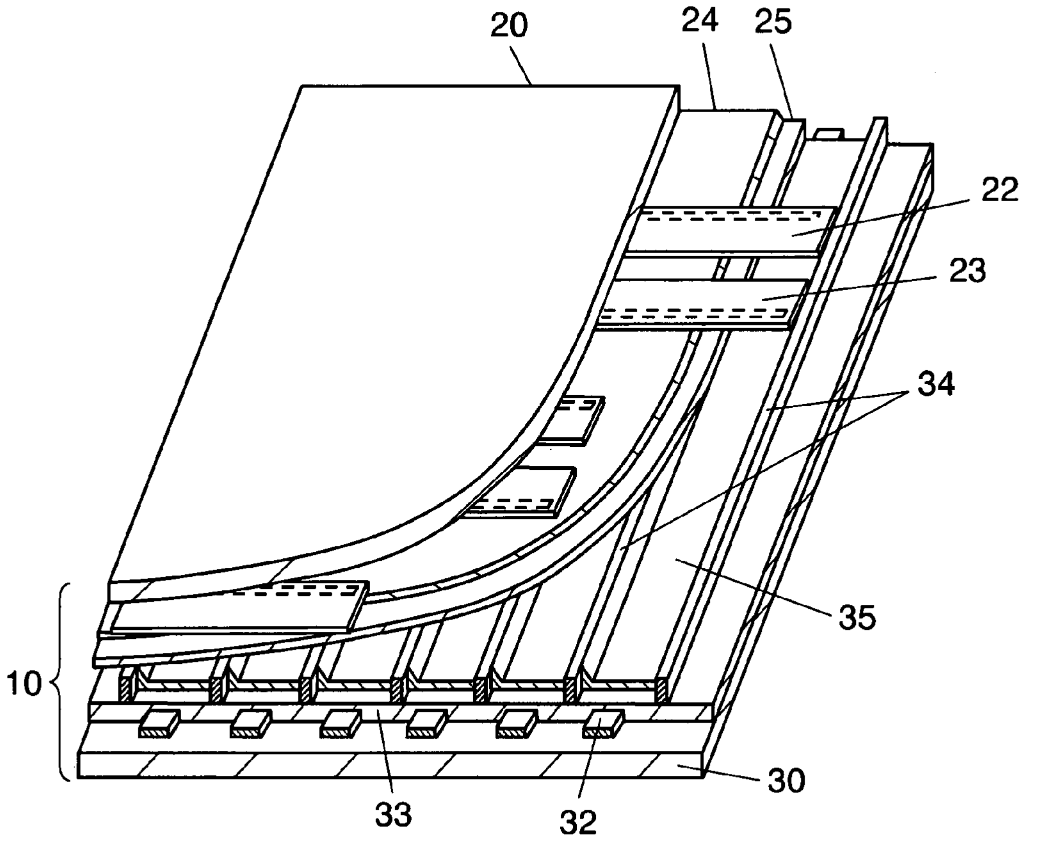
FIG. 1 is an exploded perspective view illustrating a structure of a PDP of a plasma display apparatus according to embodiment 1 of the present invention.

FIG. 1 is an exploded perspective view illustrating a structure of PDP 10 of a plasma display apparatus according to embodiment 1 of the present invention. A plurality of display electrodes which respectively include pairs of scan electrode 22 in the shape of a stripe and sustain electrode 23 in the shape of a stripe are formed on front panel 20 made of glass which is a first panel. Dielectric layer 24 is formed to cover scan electrode 22 and sustain electrode 23, and protection layer 25 is formed on dielectric layer 24. On rear panel 30 which is a second panel, a plurality of data electrodes 32 in the shape of a stripe which are covered with dielectric layer 33 are formed to three-dimensionally intersect scan electrode 22 and sustain electrode 23. A plurality of partition walls 34 are disposed parallel to data electrode 32 on dielectric layer 33, and phosphor layer 35 is formed on dielectric layer 33 between partition walls 34. Data electrode 32 is interposed between adjacent partition walls 34.

Front panel 20 and rear panel 30 are disposed to face each other with a minute discharge space interposed therebetween, so that scan electrode 22 and sustain electrode 23 intersect data electrode 32 orthogonally, and the periphery of front panel 20 and rear panel 30 is sealed by a sealing member such as glass frit. For example, a mixed gas of Neon (Ne) and Xenon (Xe) is sealed in the discharge space as discharge gas. The discharge space is divided into a plurality of partition by partition walls 34, and in each partition, phosphor layers 35 respectively emitting colors of red (R), green (G), and blue (B) are sequentially disposed. In a portion at which scan electrode 22 and sustain electrode 23 intersect data electrode 32, a discharge cell is formed, and one pixel is formed by adjacent three discharge cells in which phosphor layers 35 emitting different colors are formed. The region in which the discharge cells forming the pixel are formed becomes an image display region, and the vicinity of the image display region becomes a non display region in which an image is not displayed like a region in which the glass frit is formed or the like.

Figure 2:
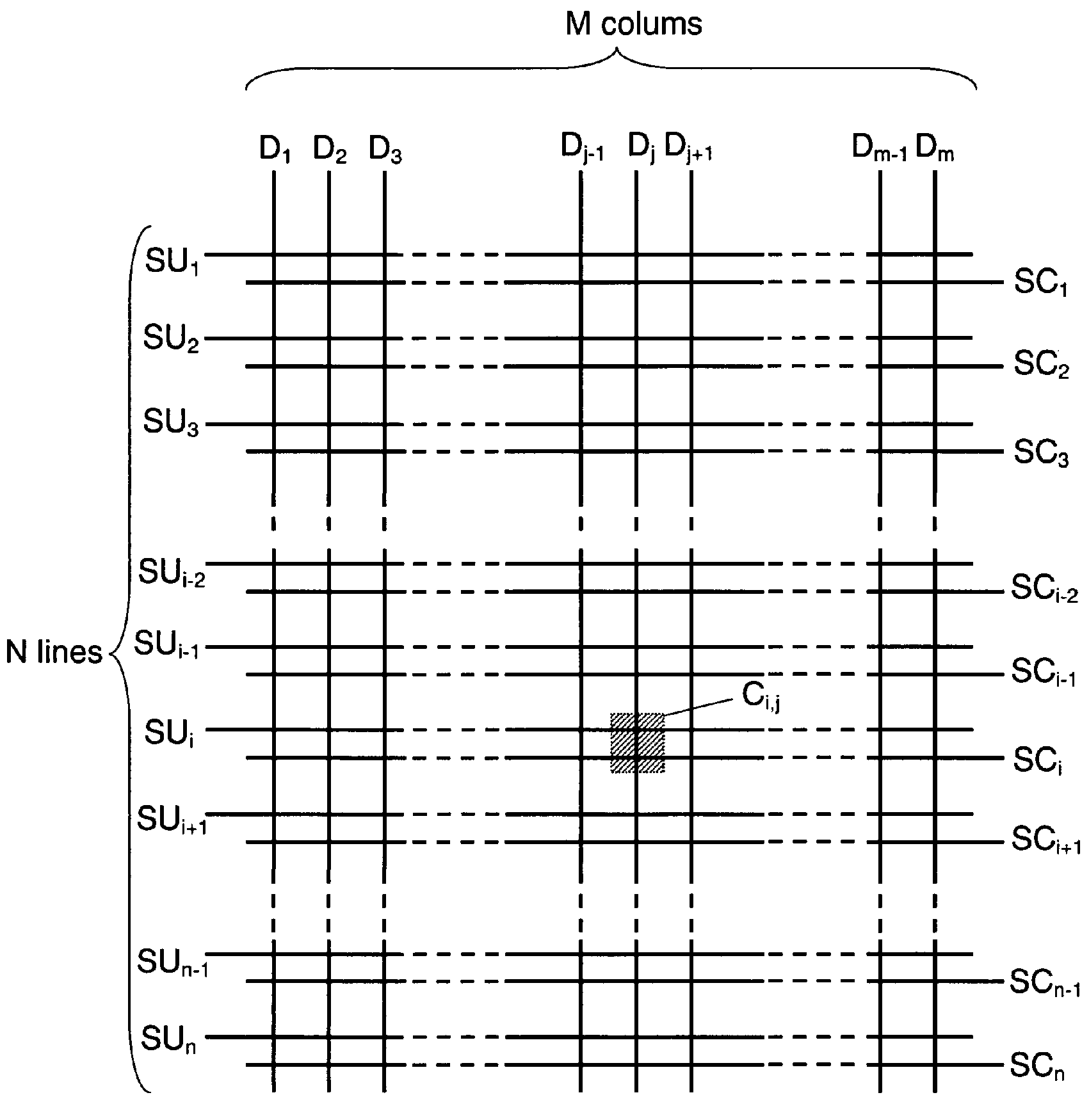
FIG. 2 is a view showing an electrode arrangement of a PDP according to the embodiment 1 of the present invention.

FIG. 2 is a view showing an electrode arrangement of PDP 10 according to embodiment 1 of the present invention. n lines of scan electrodes $SC_1$ to $SC_n$ (scan electrode 22 shown in FIG. 1) and n lines of sustain electrodes $SU_1$ to $SU_n$ (sustain electrode 23 shown in FIG. 1) are disposed alternatingly in a row direction, and m columns of data electrodes $D_1$ to $D_m$ (data electrode 32 shown in FIG. 1) are disposed in a column direction. Discharge cells $C_{i,j}$ including a pair of scan electrode $SC_i$ and sustain electrode $SU_i$ (i=1 to n) and one data electrode $D_j$ (j=1 to m), respectively, are formed in the discharge space, and the total number of discharge cells C becomes (m×n).

In PDP 10 having the structure described above, ultraviolet is generated by gas discharge, and phosphors of colors R, G, and B are excited to emit light by the ultraviolet for displaying colors. The PDP 10 divides one period of a field into a plurality of subfields and is driven by a combination of light-emitting subfields to perform gradation display. Each subfield includes an initialization period, a writing period, and a sustain period. In order to display the image data, a different signal waveform is applied to each electrode in the initialization period, a writing period, and a sustain period.

Figure 3:
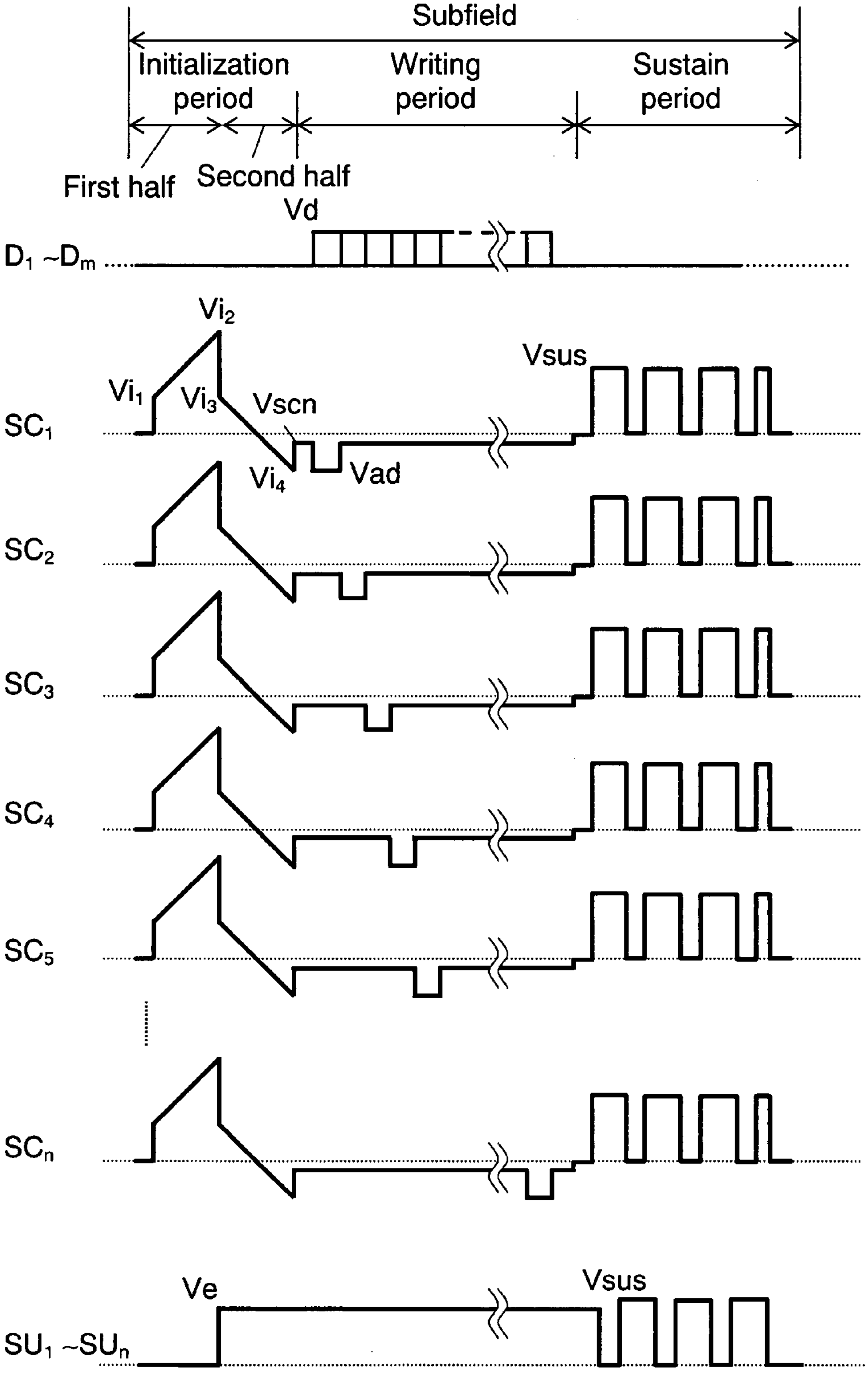
FIG. 3 is a diagram showing driving voltage waveforms applied to electrodes of a PDP according to the embodiment 1 of the present invention.

FIG. 3 is a diagram showing driving voltage waveforms applied to electrodes of PDP 10 according to embodiment 1 of the present invention. As shown in FIG. 3, each subfield includes an initialization period, a writing period, and a sustain period. Each subfield performs similar operations except for having a different number of sustain pulses included in the sustain period to change the weight of a light-emitting period, and the operation principles in the subfields are almost the same, and accordingly, here, the operation of only one subfield will be described.

At first, in the initialization period, for example, positive pulse voltages are applied to all scan electrodes $SC_1$ to $SC_n$, and required wall charges are accumulated on protection layer 25 and phosphor layer 35 on dielectric layer 24 covering scan electrodes $SC_1$ to $SC_n$ and sustain electrodes $SU_1$ to $SU_n$. In addition, priming (priming for discharge=excited particles) for stably generating writing discharge by shortening a discharge delay is generated in the initialization period.

To be more specific, in the first half of the initialization period, the voltages of data electrodes $D_1$ to $D_m$ and sustain electrodes $SU_1$ to $SU_n$ are maintained at 0 (V), respectively, and a ramp waveform voltage gradually increasing from voltage $V_{i1}$ lower than a discharge initializing voltage of data electrodes $D_1$ to $D_m$ toward voltage $V_{i2}$ higher than the discharge initializing voltage is applied to scan electrodes $SC_1$ to $SC_n$. During a time when the ramp waveform voltage increases, a first weak initialization discharge occurs between scan electrodes $SC_1$ to $SC_n$ and sustain electrodes $SU_1$ to $SU_n$ and data electrodes $D_1$ to $D_m$, respectively. Negative wall voltages are accumulated above the scan electrodes $SC_1$ to $SC_n$ and positive wall voltages are accumulated above data electrodes $D_1$ to $D_m$ and sustain electrodes $SU_1$ to $SU_n$.

Here, the wall voltage above an electrode indicates a voltage generated by the wall charges accumulated on the dielectric layer covering the electrode.

In the second half of the initialization period, the voltages of sustain electrodes $SU_1$ to $SU_n$ are maintained at positive voltage Ve, and a ramp waveform voltage gradually decreasing from voltage $V_{i3}$ lower than a discharge initializing voltage of sustain electrodes $SU_1$ to $SU_n$ toward a voltage $V_{i4}$ higher than the discharge initializing voltage is applied to scan electrodes $SC_1$ to $SC_n$. During the period, a second weak initialization discharge occurs between scan electrodes $SC_1$ to $SC_n$ and sustain electrodes $SU_1$ to $SU_n$ and data electrodes $D_1$ to $D_m$, respectively.

Then, the negative wall voltages above scan electrodes $SC_1$ to $SC_n$ and the positive wall voltages above sustain electrodes $SU_1$ to $SU_n$ become weak, and thus the positive wall voltages above data electrodes $D_1$ to $D_m$ are adjusted to values proper for a writing operation. By the operations described above, the initialization operation is completed (hereinafter, a driving voltage applied to each electrode during the initialization period is simply referred to as an initialization waveform).

Next, in the writing period, scanning is performed by sequentially applying a negative scan pulse to all scan electrodes $SC_1$ to $SC_n$. In addition, during the scanning of scan electrodes $SC_1$ to $SC_n$ a positive writing pulse voltage is applied to data electrodes $D_1$ to $D_m$ based on the display data. Accordingly, writing discharge occurs between scan electrodes $SC_1$ to $SC_n$ and data electrodes $D_1$ to $D_m$ to form wall charges on a surface of protection layer 25 on scan electrodes $SC_1$ to $SC_n$.

To be more specific, in the writing period, the voltages of scan electrodes $SC_1$ to $SC_n$ are maintained at voltage Vscn, at first. Then, in a writing operation of discharge cells $C_{p,1}$ to $C_{p,m}$ (p is an integer in the range of 1 to n), scan pulse voltage Vad is applied to scan electrode $SC_p$, and simultaneously, positive writing pulse voltage Vd is applied to data electrode $D_q$ ($D_q$ is a data electrode selected among $D_1$ to $D_m$ based on an image signal) corresponding to an image signal to be displayed at the p-th line among data electrodes $D_1$ to $D_m$. Accordingly, writing discharge occurs in discharge cell $C_{p,q}$ corresponding to an intersection of data electrode $D_q$, to which the writing pulse voltage is applied and scan electrode $SC_p$ to which the scan pulse voltage is applied. Due to the writing discharge, a positive voltage is accumulated in the top surface of scan electrode $SC_p$ of discharge cell $C_{p,q}$ and a negative voltage is accumulated in the top surface of sustain electrode $SU_p$ to complete the writing operation for the discharge cell. Next, the same writing operation is repeated for the next discharge cell until n-th discharge cell $C_{n,q}$ is reached to complete the writing operation.

In the following sustain period, a voltage sufficient to maintain the discharge between scan electrodes $SC_1$ to $SC_n$ and sustain electrodes $SU_1$ to $SU_n$ is applied for a predetermined period. Accordingly, discharge plasma is formed between scan electrodes $SC_1$ to $SC_n$ and sustain electrodes $SU_1$ to $SU_n$ to excite phosphor layer 35 for light emission for a predetermined time. At this time, in a discharge space to which a writing pulse voltage has not been applied during the writing period, discharge does not occur and accordingly, the excitation and light-emission of phosphor layer 35 do not occur.

To be more specific, in the sustain period, after the voltages of scan electrodes $SC_1$ to $SC_n$ are, at first, set back to 0 (V), positive sustain pulse voltage Vsus is applied to scan electrodes $SC_1$ to $SC_n$. Thereafter, sustain electrodes $SU_1$ to $SU_n$ are set back to 0 (V). At this time, the voltage between the top surfaces of scan electrode $SC_p$ and sustain electrode $SU_p$ of discharge cell $C_{p,q}$ which causes the writing discharge becomes higher than the discharge initiating voltage to cause the first sustain discharge since the wall voltages accumulated in the top surfaces of scan electrode $SC_p$ and sustain electrode $SU_p$ during the writing period are added to the positive sustain pulse voltage Vsus. In discharge cell $C_{p,q}$ which causes the sustain discharge, a negative voltage is accumulated in the top surface of scan electrode $SC_p$ and a positive voltage is accumulated in the top surface of sustain electrode $SU_p$ so as to remove a voltage difference between the scan electrode $SC_p$ and sustain electrode $SU_p$ at a time when the sustain discharge occurs. As described above, the first sustain discharge is completed. After the first sustain discharge, Vsus is applied to sustain electrodes $SU_1$ to $SU_n$, and then the voltages of scan electrodes $SC_1$ to $SC_n$ are set back to 0 (V). At this time, a voltage between the top surfaces of scan electrode $SC_p$ and sustain electrode $SU_p$ in discharge cell $C_{p,q}$ which causes the first sustain discharge becomes higher than the discharge initiating voltage to cause the second sustain discharge since the wall voltages accumulated in the top surfaces of scan electrode $SC_p$ and sustain electrode $SU_p$ by the first sustain discharge are added to the positive sustain pulse voltage Vsus. Thereafter, similarly, the sustain discharge for the discharge cell $C_{p,q}$ which causes the writing discharge is continuously performed as many times as the number of the sustain pulses by alternatingly applying the sustain pulse to scan electrodes $SC_1$ to $SC_n$ and sustain electrodes $SU_1$ to $SU_n$.

The electrode disposition of PDP 10 and the waveforms and timing of driving voltages for driving PDP 10 are as described above.

Figure 4:
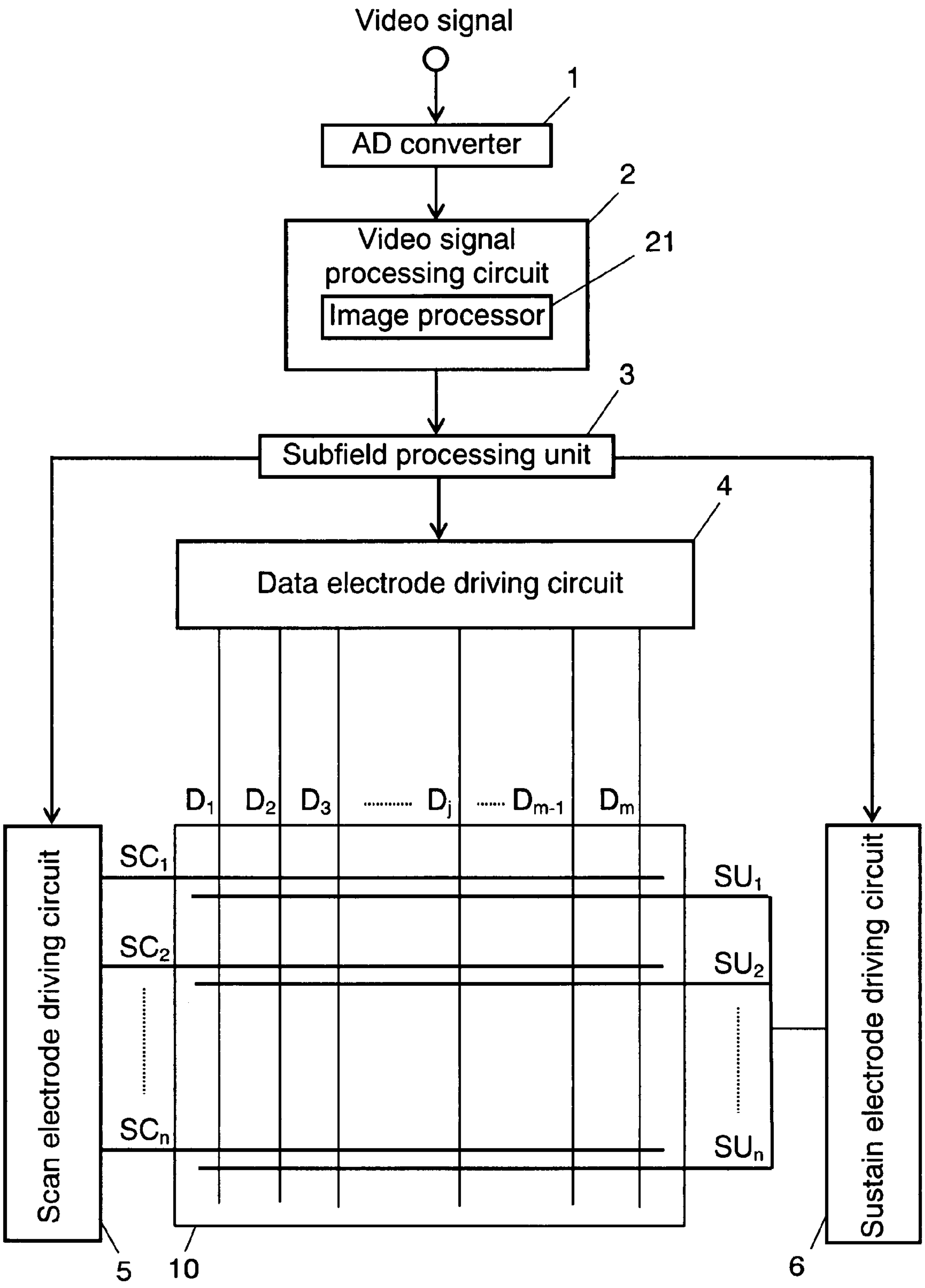
FIG. 4 is a block diagram showing a configuration of the plasma display apparatus according to the embodiment 1 of the present invention.

FIG. 4 is a block diagram showing a configuration of the plasma display apparatus according to embodiment 1 of the present invention. The plasma display apparatus shown in FIG. 4 includes AD converter 1, image signal processing circuit 2, subfield processing circuit 3, data electrode driving circuit 4, scan electrode driving circuit 5, sustain electrode driving circuit 6, and PDP 10.

AD converter 1 converts an input analog video signal into a digital video signal. Image signal processing circuit 2 converts one field of a video signal into subfield data which controls subfields for performing light emission of PDP 10 for displaying the input digital video signal by a combination of a plurality of subfields having different weights of light-emitting periods. In addition, since image signal processing circuit 2 includes image processor 21 inside which is an image signal processing device, image signal processing circuit 2 detects a motion picture region and a still image region from the input digital video signal and performs different processes for the motion picture and still image regions, respectively.

Subfield processing circuit 3 generates a control signal for data electrode driving circuit, a control signal for scan electrode driving circuit, and a control signal for sustain electrode driving circuit from subfield data prepared by image signal processing circuit 2 and outputs the control signals to data electrode driving circuit 4, scan electrode driving circuit 5, and sustain electrode driving circuit 6, respectively.

PDP 10, as described above, n lines of scan electrodes $SC_1$ to $SC_n$ (scan electrode 22 shown in FIG. 1) and n lines of sustain electrodes $SU_1$ to $SU_n$ (sustain electrode 23 shown in FIG. 1) are disposed alternatingly in a row direction, and m columns of data electrodes $D_1$ to $D_m$ (data electrode 32 shown in FIG. 1) are disposed in a column direction. (m×n) discharge cells $C_{i,j}$ including a pair of scan electrode $SC_i$ and sustain electrode $SU_i$ (i=1 to n) and one data electrode $D_j$ (j=1 to m), respectively, are formed in the discharge space, and one pixel is formed by three discharge cells which perform light-emission of red, green, and blue colors, respectively.

Data electrode driving circuit 4 includes driving circuits therein which can independently drive data electrodes $D_1$ to $D_m$ and independently drives data electrodes $D_1$ to $D_m$, based on a control signal for the data electrode driving circuit, respectively. Scan electrode driving circuit 5 includes the driving circuits therein which can independently drive scan electrodes $SC_1$ to $SC_n$ and independently drives scan electrodes $SC_1$ to $SC_n$ based on a control signal for scan electrode driving circuit, respectively. Sustain electrode driving circuit 6 includes a driving circuit inside which can drive all sustain electrodes $SU_1$ to $SU_n$ of PDP 10 collectively as one and drives sustain electrodes $SU_1$ to $SU_n$ based on a control signal for sustain electrode driving circuit. The driving of each electrode is the same as described above with reference to FIG. 3.

Figure 5:
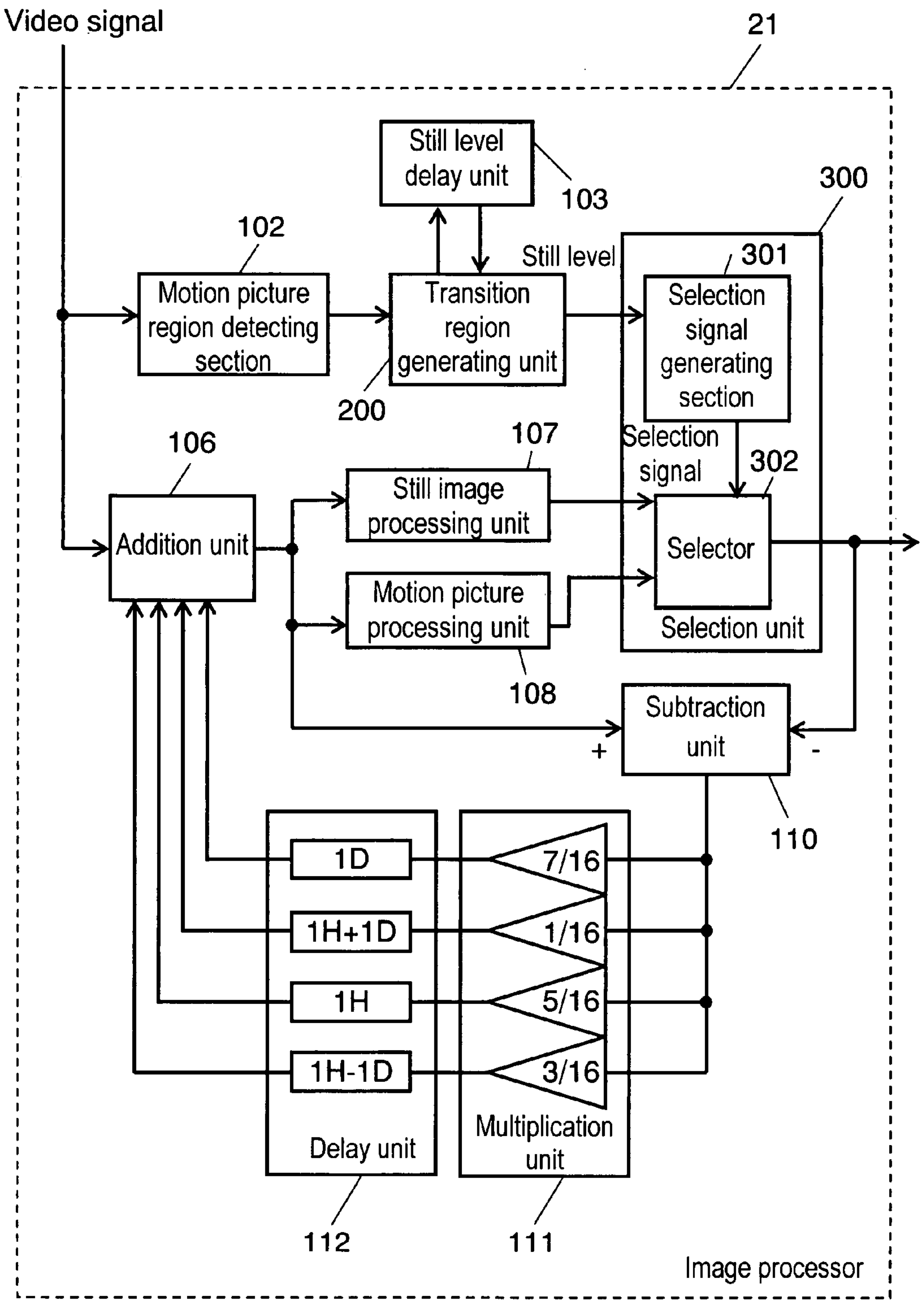
FIG. 5 is a block diagram showing an electrical configuration of an image processor of a plasma display apparatus according to the embodiment 1 of the present invention.

FIG. 5 is a block diagram showing an electrical configuration of image processor 21 of a plasma display apparatus according to embodiment 1 of the present invention.

As shown in FIG. 5, image processor 21 according to embodiment 1 of the present invention includes motion picture region detecting unit 102 which detects a motion picture region in an input video signal, transition region generating unit 200 generating a transition region for which a motion picture process and a still image process are mixedly performed, still level delay unit 103 which delays data used for generating the transition region by a predetermined time for output, addition unit 106 which adds an error diffused from neighboring pixels to a video signal, still image processing unit 107 which performs a still image process on a video signal, motion picture processing unit 108 which performs a motion picture process on a video signal, selection unit 300 which selects one between a video signal on which the still image process has been performed and a video signal on which the motion picture process has been performed for output, subtraction unit 110 which calculates a difference between an input video signal and a video signal output from video signal selection unit 300 as an error, multiplication unit 111 which gives a weight by multiplying a calculated error by a predetermined constant, and delay unit 112 which delays a weighted error for diffusing the weighted error to neighboring pixels.

Motion picture region detecting unit 102 detects a motion picture region by using a generally known technique including a method in which a difference between the current frame of the input video signal and the previous frame of the video signal is calculated, the calculated difference is compared with a threshold value which is set for detecting a motion picture region, and a region for which a difference greater than the threshold value is acquired is determined to be a motion picture region.

Transition region generating unit 200 generates a signal called a still level using a signal indicating a motion picture region which is detected by motion picture region detecting unit 102 for generating a transition region in which the motion picture process and still image process are mixedly performed. The still level is information for reflecting information on the motion picture region detected in the past on the motion picture process and still image process of the current frame. In embodiment 1 of the present invention, a mixing ratio of the motion picture process and the still image process is changed to be performed based on the value of the still level. Transition region generating unit 200 and the still level will be described in detail later.

Still level delay unit 103 includes a generally known storage device such as a semiconductor memory storing electronic data in an electronic storage element such as a condenser and stores information used for generating a transition region which is generated by transition region generating unit 200, that is, information on the still level. The stored information on the still level is output to transition region generating unit 200 after a predetermined time elapses.

Addition unit 106 adds an error diffused from neighboring pixel by the error diffusion to the input video signal.

Still image processing unit 107 performs a still image process on a video signal to which an error has been added by addition unit 106 and outputs the processed video signal. Motion picture processing unit 108 performs a motion picture process such as a conversion process into a gradation level for which a dynamic false contour is difficult to occur, that is, a gradation level for motion picture display on the video signal to which an error has been added by addition unit 106 and outputs the processed video signal.

Selection unit 300 includes selection signal generating section 301 and selector 302. Selection signal generating section 301 generates a selection signal for selecting one between a video signal on which a still image process has been performed and a video signal on which a motion picture process has been performed based on the still level generated by transition region generating region 200 and outputs the selection signal. Selection signal generating section 301 and the selection signal will be described later in detail. Selector 302 selects one between a video signal on which a still image process has been performed and a video signal on which a motion picture process has been performed based on the selection signal output from transition region generating region 200 and outputs the selected video signal. A video signal output from selection unit 300 is output to a circuit block in the next stage for being displayed in PDP 10.

Subtraction unit 110 subtracts a video signal output from selection unit 300 from a video signal output from addition unit 106 so as to calculate an error of the video signal output from selection unit 300 with respect to an input video signal.

Multiplication unit 111 calculates 7/16, 1/16, 5/16, and 3/16 times the error output from subtraction unit and respectively outputs the calculated errors so as to give predetermined weights to the error calculated by subtraction unit 110. Delay unit 112 delays an error multiplied by 7/16 by one pixel period (1D), an error multiplied by 1/16 by "one horizontal scan period+one pixel period" (1H+1D), an error multiplied by 5/16 by one horizontal scan period (1H), an error multiplied by 3/16 by "one horizontal scan period−one pixel period" (1H−1D) and outputs the delayed errors. In this way, the delayed errors are diffused to neighboring pixels and are added to the video signal input by addition unit 106.

Next, transition region generating unit 200 will now be described in detail.

Figure 6:
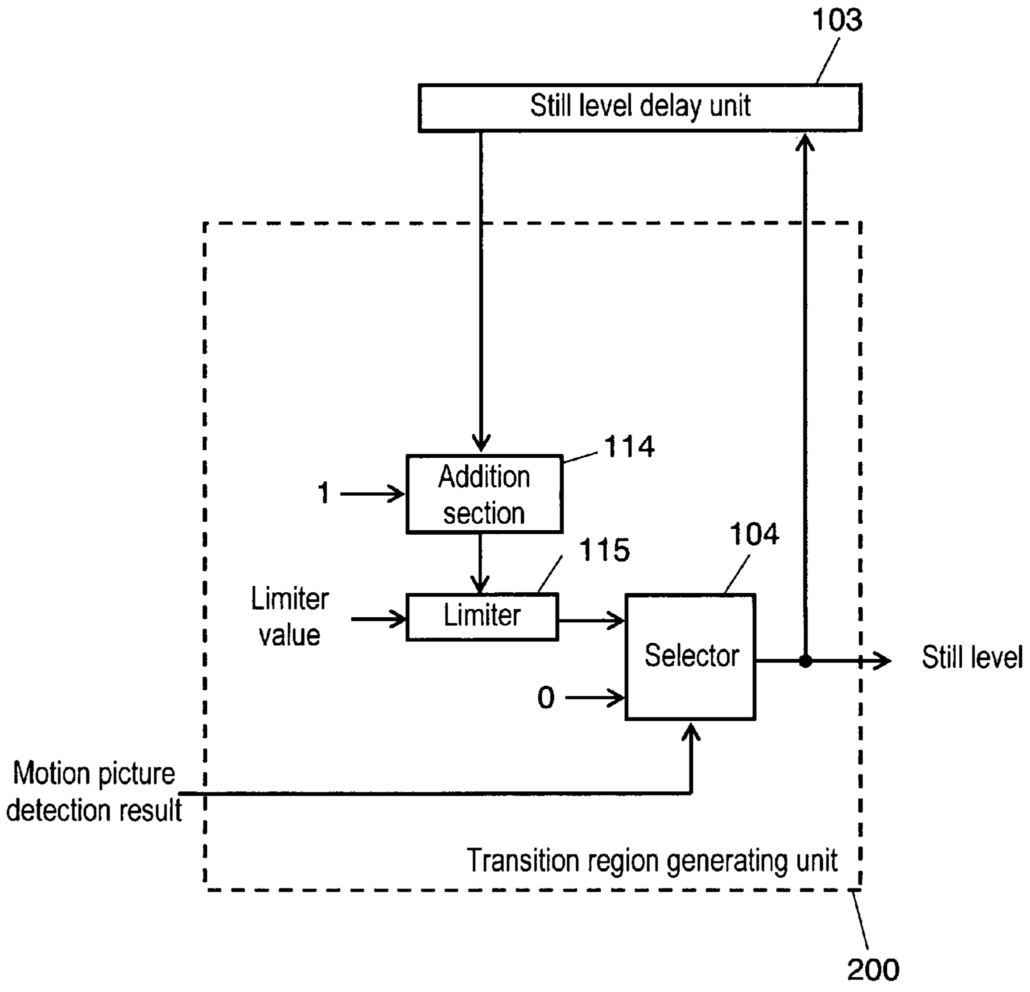
FIG. 6 is a block diagram showing an electrical configuration of a transition region generating unit of the plasma display apparatus according to embodiment 1 of the present invention.

Transition region generating unit 200 generates and outputs a still level for performing a motion picture process with information on the motion picture region detected in the past reflected on the current frame. FIG. 6 is a block diagram showing an electrical configuration of transition region generating unit 200 of the plasma display apparatus according to embodiment 1 of the present invention.

As shown in FIG. 6, transition region generating unit 200 according to embodiment 1 of the present invention includes addition section 114 which adds a correction value to a value output from still level delay unit 103, limiter 115 which limits the value of the "still level", and selector 104 which selects one between a value output from limiter 115 and an initial value to be output as a still level.

Addition section 114 adds "1" as a correction value to a value output from still level delay unit 103.

Limiter 115 compares a value output from addition section 114 to a predetermined limiter value and outputs any one smaller than the other. When those values are the same, limiter 115 outputs the same value.

Selector 104 selects an initial value of "0" as a still level for a motion picture region based on the result of motion picture region detection which is output from motion picture region detecting unit 102 and outputs the still level. On the other hand, selector 104 selects and outputs a value which was output as a still level output from level delay unit 103, was increased by "1" by addition section 114, and was limited to a predetermined value by limiter 115 for a non motion picture region, that is, a still image region.

The still level selected by selector 104 is output to both a circuit block in the next stage and still level delay unit 103. The still level input to still level delay unit 103 is delayed by a predetermined time, for example, one frame period in a case where a process is performed in units of frames and is output. A series of above-described operations of adding "1" by addition unit section 114, limiting to a predetermined limiter value by limiter 115, and inputting to selector 104 are repeatedly performed on the "still level" output from still level delay unit 103.

Accordingly, the "still level" of a region which is determined to be a motion picture region before n frames and is determined to be a still image region from a frame before (n−1) frames to the current frame becomes "n". To be more specifically, the "still level" of a frame which is determined to be a motion picture region before seven frames and is determined to be a still image region from a frame before six frames to the current frame becomes "7", the "still level" of a frame which is determined to be a motion picture region before six frames and is determined to be a still image region from a frame before five frames to the current frame becomes "6", and the "still level" of a frame which is determined to be a motion picture region before five frames and is determined to be a still image region from a frame before four frames to the current frame becomes "5". In addition, the "still level" of a frame which is determined to be a motion picture region before four frames and is determined to be a still image region from a frame before three frames to the current frame becomes "4", the "still level" of a frame which is determined to be a motion picture region before three frames and is determined to be a still image region from a frame before two frames to the current frame becomes "3", the "still level" of a frame which is determined to be a motion picture region before two frames and is determined to be a still image region from a frame before one frame to the current frame becomes "2", and the "still level" of a frame which is determined to be a motion picture region before one frame and is determined to be a still image region in the current frame becomes "1", and a frame which is determined to be a motion picture region in the current frame becomes zero.

Transition region generating unit 200 generates "still levels" by sequentially repeating the above-described series of operations, and a transition region for which a motion picture process and a still image process are mixedly performed is generated.

The "still level" generated by transition region generating region 200 as described above is output to selection signal generating section 301 in the next stage.

Next, selection signal generating section 301 will be described.

Figure 7:
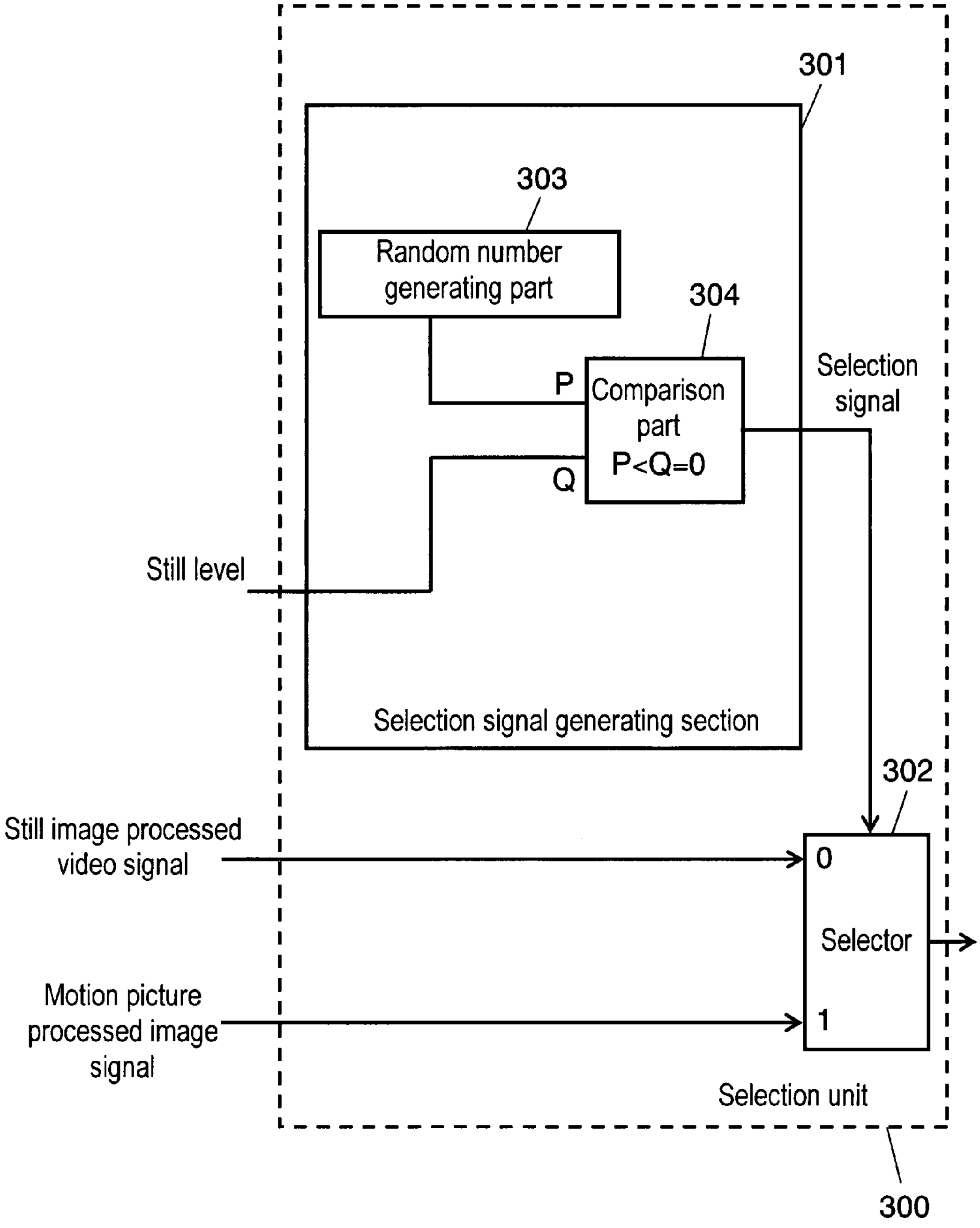
FIG. 7 is a block diagram showing an electrical configuration of a selection signal generating unit of the plasma display apparatus according to the embodiment 1 of the present invention.

Selection signal generating section 301 generates a selection signal for including a video signal on which a motion picture process has been performed and a video signal on which a still image process has been performed together in the transition region based on the still level which has been generated by transition region generating region 200. FIG. 7 is a block diagram showing an electrical configuration of selection signal generating section 301 of the plasma display apparatus according to embodiment 1 of the present invention.

As shown in FIG. 7, selection signal generating section 301 according to embodiment 1 of the present invention includes random number generating part 303 and comparison part 304.

Random number generating part 303 generates and outputs an integer random number in the range of zero to a predetermined number. At this time, the maximal value of the generated random number is set to a value resulting from subtracting one from the limiter value in limiter 115, that is, a value resulting from subtracting one from a maximal value of the "still level". For example, when the maximal value of the still levels is "7", random number generating part 303 generates an integer random number in the range of "0" to "6". The random number generated by random number generating part 303 may be a pseudo-random number.

Comparison part 304 compares a random number generated by random generating section 303 and a "still level" output from transition region generating unit 200 and outputs a signal (here, referred to as "0") for selecting a video signal on which a still image process has been performed as a selection signal when the still level is greater than the random number. On the other hand, when the still level is not greater than the random number, comparison part 304 outputs a signal (here, referred to as “1”) for selecting a video signal on which a motion picture process has been performed as a selection signal. Since the maximal value generated by random number generating part 303 is a value resulting from subtracting one from a maximal value of the still level, comparison part 304 always output “0” when the still level has the maximal value.

Selector 302 performs a selection operation based on the selection signal generated by comparison part 304 as described above. When the selection signal is “0”, selector 302 selects and outputs a video signal on which a still image process has been performed by still image processing unit 107. On the other hand, when the selection signal is “1”, selector 302 selects and outputs a video signal on which a motion picture process has been performed by motion picture processing unit 108.

Next, the reason a video signal on which a motion picture process has been performed and a video signal on which a still image process has been performed can be included together in the transition region by the above-described series of operations will be described. Here, it is assumed that the limiter value of limiter 115 is “7” as described above and that random number generating part 303 generates integers of “0” to “6” with the same probability of occurrence for each integer in the following description.

For example, the “still level” of a region which is determined to be a motion picture region for a frame before seven frames and is determined to be a still image region from a frame six frames before to the current frame becomes “7”. In this case, since the still level of “7” is greater than any integer of “0” to “6” generated by random number generating part 303, the selection signal for the region becomes always zero, and accordingly, a video signal on which a still image process has been performed is always output from selector 302.

The “still level” of a region which is determined to be a motion picture region for a frame before six frames and is determined to be a still image region from a frame five frames before to the current frame becomes “6”. Since the probability of occurrence of “0” to “5” generated by random number generating part 303 is 6/7, the probability in that the selection signal becomes “0” in the region, that is, the probability in that a video signal on which a still image process has been performed is selected by selector 302 becomes 6/7. Since the probability of occurrence of “6” generated by random number generating part 303 is 1/7, the probability in that the selection signal becomes “1” in the region, that is, the probability in that a video signal on which a motion picture process has been processed is selected by selector 302 becomes 1/7. Accordingly, a video signal on which a still image process has been processed and a video signal on which a motion picture process has been processed are output from selector 302 with a ratio of 6:1.

In addition, the “still level” of a region which is determined to be a motion picture region for a frame before five frames and is determined to be a still image region from a frame four frames before to the current frame becomes “5”. Since the probability of occurrence of “0” to “4” generated by random number generating part 303 is 5/7, the probability in that the selection signal becomes “0” in the region, that is, the probability in that a video signal on which a still image process has been performed is selected by selector 302 becomes 5/7. Since the probability of occurrence of “5” and “6” generated by random number generating part 303 is 2/7, the probability in that the selection signal becomes “1” in the region, that is, the probability in that a video signal on which a motion picture process has been processed is selected by selector 302 becomes 2/7. Accordingly, a video signal on which a still image process has been processed and a video signal on which a motion picture process has been processed are output from selector 302 with a ratio of 5:2.

In addition, the “still level” of a region which is determined to be a motion picture region for a frame before four frames and is determined to be a still image region from a frame three frames before to the current frame becomes “4”. Since the probability of occurrence of “0” to “3” generated by random number generating part 303 is 4/7, the probability in that the selection signal becomes “0” in the region, that is, the probability in that a video signal on which a still image process has been performed is selected by selector 302 becomes 4/7. Since the probability of occurrence of “4” to “6” generated by random number generating part 303 is 3/7, the probability in that the selection signal becomes “1” in the region, that is, the probability in that a video signal on which a motion picture process has been processed is selected by selector 302 becomes 3/7. Accordingly, a video signal on which a still image process has been processed and a video signal on which a motion picture process has been processed are output from selector 302 with a ratio of 4:3.

In addition, the “still level” of a region which is determined to be a motion picture region for a frame before three frames and is determined to be a still image region from a frame two frames before to the current frame becomes “3”. Since the probability of occurrence of “0” to “2” generated by random number generating part 303 is 3/7, the probability in that the selection signal becomes “0” in the region, that is, the probability in that a video signal on which a still image process has been performed is selected by selector 302 becomes 3/7. Since the probability of occurrence of “3” to “6” generated by random number generating part 303 is 4/7, the probability in that the selection signal becomes “1” in the region, that is, the probability in that a video signal on which a motion picture process has been processed is selected by selector 302 becomes 4/7. Accordingly, a video signal on which a still image process has been processed and a video signal on which a motion picture process has been processed are output from selector 302 with a ratio of 3:4.

In addition, the “still level” of a region which is determined to be a motion picture region for a frame before two frames and is determined to be a still image region from a frame one frame before to the current frame becomes “2”. Since the probability of occurrence of “0” to “1” generated by random number generating part 303 is 2/7, the probability in that the selection signal becomes “0” in the region, that is, the probability in that a video signal on which a still image process has been performed is selected by selector 302 becomes 2/7. Since the probability of occurrence of “2” to “6” generated by random number generating part 303 is 5/7, the probability in that the selection signal becomes “1” in the region, that is, the probability in that a video signal on which a motion picture process has been processed is selected by selector 302 becomes 5/7. Accordingly, a video signal on which a still image process has been processed and a video signal on which a motion picture process has been processed are output from selector 302 with a ratio of 2:5.

In addition, the “still level” of a region which is determined to be a motion picture region for a frame before one frame and is determined to be a still image region for the current frame becomes one. Since the probability of occurrence of “0” generated by random number generating part 303 is 1/7, the probability in that the selection signal becomes “0” in the region, that is, the probability in that a video signal on which a still image process has been performed is selected by selector 302 becomes 1/7. Since the probability of occurrence of “1” to “6” generated by random number generating part 303 is 6/7, the probability in that the selection signal becomes "1" in the region, that is, the probability in that a video signal on which a motion picture process has been processed is selected by selector 302 becomes 6/7. Accordingly, a video signal on which a still image process has been processed and a video signal on which a motion picture process has been processed are output from selector 302 with a ratio of 1:6.

In addition, the "still level" of a region which is determined to be a motion picture region for the current frame becomes "0". In this case, since any integer of "0" to "6" generated by random number generating part 303 is greater than the still level of "0", the selection signal in the region always becomes one, and accordingly, a video signal on which a motion picture process has been processed is always output from selector 302.

The above-described operations can be summed up as follows. The maximal value of the "still level" is assumed to be n (where n is an integer equal to or greater than "0"), and the "still level" of a region which is determined to be a motion picture region for a frame before m (where m is an integer which is equal to or greater than "0" and is equal to or smaller than "n") frames and is determined to be a still image region from a frame thereafter to the current frame becomes "m" (for a region which is determined to be a motion picture region for the current frame, the still level becomes "0"). When random number generating part 303 generates integers from "0" to n−1 with a same probability of occurrence, since the probability of occurrence of "0" to "m−1" generated by random number generating part 303 is m/n, the probability in that the selection signal becomes "0" in the region, that is, the probability in that a video signal on which a still image process has been performed is selected by selector 302 becomes m/n. Since the probability of occurrence of "m" to "n−1" generated by random number generating part 303 is (n−m)/n, the probability in that the selection signal becomes one in the region, that is, the probability in that a video signal on which a motion picture process has been processed is selected by selector 302 becomes (n−m)/n. Accordingly, a video signal on which a still image process has been processed and a video signal on which a motion picture process has been processed are output from selector 302 with a ratio of m:(n−m).

Accordingly, for a region which was determined to be a motion picture region in the past, a video signal on which a still image process has been performed and a video signal on which a motion picture process has been performed are mixed to be output, and for a region which was determined to be a motion picture region in the past the longer time ago, the more the ratio of the video signal on which a still image process has been processed in the output increases. Accordingly, the switching shock which occurs in a boundary between a motion picture region and a still image region can be reduced in embodiment 1 of the present invention.

The operations will be described in detail with reference to accompanying drawings.

Figure 8A:
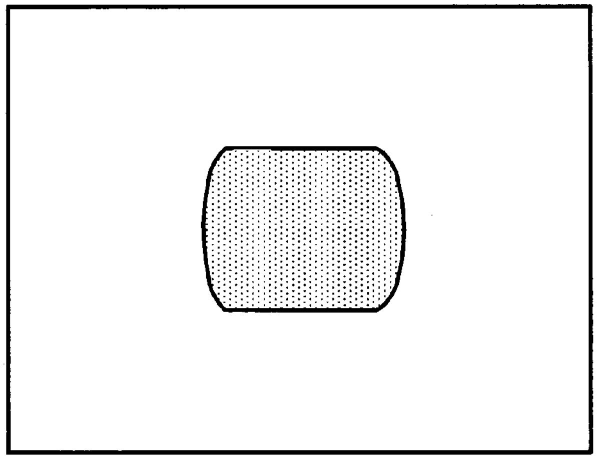
FIG. 8A is a schematic view showing an example of detecting a motion picture region.
Figure 8B:
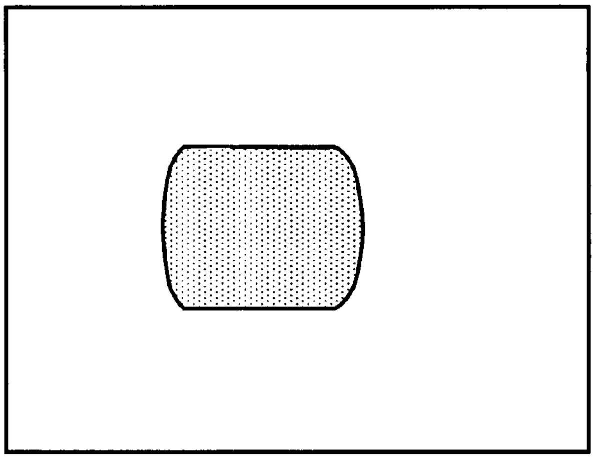
FIG. 8B is a schematic view showing an example of detecting a motion picture region.
Figure 8C:
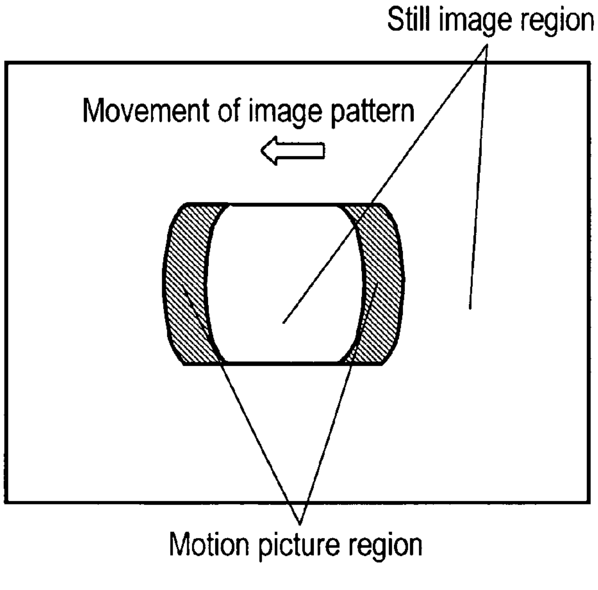
FIG. 8C is a schematic view showing an example of detecting a motion picture region.

FIGS. 8A, 8B and 8C are schematic views showing an example of detecting a motion picture region.

As shown in FIGS. 8A, 8B and 8C, in a case where an image pattern moves from frame (N−1) to frame N (N is a natural number), a difference between frames is calculated by subtracting a video signal of frame (N−1) from a video signal of frame N, and accordingly, a motion picture region (hatched area in the figure) can be detected as shown in FIG. 8C.

Figure 9:
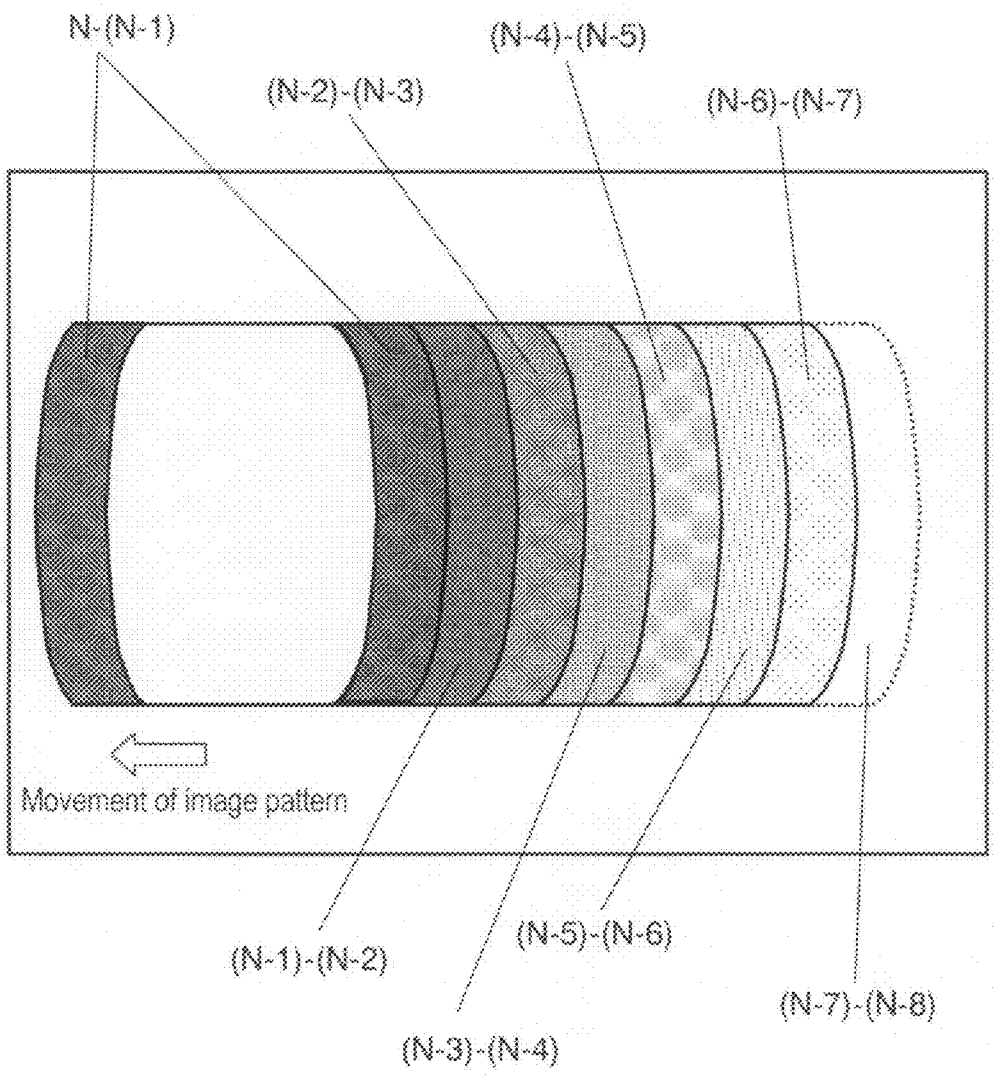
FIG. 9 is a schematic diagram showing an example of the result of calculating a still level according to the embodiment 1 of the present invention.

FIG. 9 is a schematic diagram showing an example of the result of calculating a still level according to embodiment 1 of the present invention.

For example, in a case where an image pattern shown in FIGS. 8A, 8B and 8C moves continuously with a constant amount of movement, a motion picture region which is acquired by subtracting a video signal of a frame before one frame from a video signal of the current frame (hereinafter, the current frame is denoted as "N", and a motion picture region acquired by using a difference between frames, for example, a difference between the current frame and a frame before one frame, is denoted as "N−(N−1)") becomes a region denoted by N−(N−1) in FIG. 9. Likewise, a motion picture region which is acquired by using a difference between a video signal of a frame before one frame and a video signal of a frame before two frames becomes a region denoted by (N−1)-(N−2) shown in FIG. 9, a motion picture region which is acquired by using a difference between a video signal of a frame before two frames and a video signal of a frame before three frames becomes a region denoted by (N−2)-(N−3) shown in FIG. 9, and a motion picture region which is acquired by using a difference between a video signal of a frame before three frames and a video signal of a frame before four frames becomes a region denoted by (N−3)-(N−4) shown in FIG. 9. In addition, a motion picture region which is acquired by using a difference between a video signal of a frame before four frames and a video signal of a frame before five frames becomes a region denoted by (N−4)-(N−5) shown in FIG. 9, a motion picture region which is acquired by using a difference between a video signal of a frame before five frames and a video signal of a frame before six frames becomes a region denoted by (N−5)-(N−6) shown in FIG. 9, a motion picture region which is acquired by using a difference between a video signal of a frame before six frames and a video signal of a frame before seven frames becomes a region denoted by (N−6)-(N−7) shown in FIG. 9, and a motion picture region which is acquired by using a difference between a video signal of a frame before seven frames and a video signal of a frame before eight frames becomes a region denoted by (N−7)-(N−8) shown in FIG. 9.

In embodiment 1 of the present invention, since the "still level" of the region denoted by N−(N−1) shown in FIG. 9 is set to "0" by the above-described operations of the circuit blocks, motion picture processes are performed on all the video signals of the current frame in the region. Since the "still level" of a motion picture region denoted by (N−1)-(N−2) becomes "1", still image processes are performed on the video signals corresponding to the number of 1/7 pixels of the region in the current frame, and motion picture processes are performed on the video signals corresponding to the number of 6/7 pixels of the region. In addition, since the "still level" of a motion picture region denoted by (N−2)-(N−3) becomes "2", still image processes are performed on the video signals corresponding to the number of 2/7 pixels of the region in the current frame, and motion picture processes are performed on the video signals corresponding to the number of 5/7 pixels of the region. Since the "still level" of a motion picture region denoted by (N−3)-(N−4) becomes "3", still image processes are performed on the video signals corresponding to the number of 3/7 pixels of the region in the current frame, and motion picture processes are performed on the video signals corresponding to the number of 4/7 pixels of the region. In addition, since the "still level" of a motion picture region denoted by (N−4)-(N−5) becomes "4", still image processes are performed on the video signals corresponding to the number of 4/7 pixels of the region in the current frame, and motion picture processes are performed on the video signals corresponding to the number of 3/7 pixels of the region. Since the "still level" of a motion picture region denoted by (N−5)-(N−6) becomes "5", still image processes are performed on the video signals corresponding to the number of 5/7 pixels of the region in the current frame, and motion picture processes are performed on the video signals corresponding to the number of 2/7 pixels of the region. In addition, since the "still level" of a motion picture region denoted by (N−6)-(N−7) becomes "6", still image processes are performed on the video signals corresponding to the number of 6/7 pixels of the region in the current frame, and motion picture processes are performed on the video signals corresponding to the number of 1/7 pixels of the region. Since the "still level" of a motion picture region denoted by (N−7)-(N−8) becomes "7", still image processes are performed on all the video signals of the region in the current frame.

As described above, since a ratio of a video signal on which a still image process is performed and a video signal on which a motion picture process is performed is changed based on the still level generated by transition region generating unit 200 in a configuration according to embodiment 1 of the present invention, the ratio of a video signal on which a still image process has been performed and a video signal on which a motion picture process has been performed in a transition region can be changed slowly as time elapses. In addition, since a video signal on which a still image process is to be performed and a video signal on which a motion picture process is to be performed are determined based on a random number generated by random number generating part 303, a video signal on which a still image process has been performed and a video signal on which a motion picture process has been performed can be in a randomly mixed status in the transition region. By using the above-described technique, the switching shock which occurs in the boundary between a motion picture region and a still image region is reduced, and accordingly, it becomes possible to display a motion picture smoothly.

In addition, according to embodiment 1 of the present invention, retrospectively up to what time point the results of detecting motion picture regions in the past will be used can be set by the value of the limiter in limiter 115 and the range of random numbers generated by random number generating part 303. In the above-described example, since an initial value of a "still level" of a motion picture region is set to "0" and a correction value of one is added to the "still level" output from still level delay unit 103 by addition section 114, for example, when the value of limiter is set to "7" and random numbers generated by random number generating unit 303 are set to integers in the range of "0" to "6", the results of detecting motion picture regions detected in a frame before the maximal seven frames before can be reflected on a motion picture process of the current frame. As described above, by setting the value of limiter in limiter 115 and the range of random numbers generated by random number generating part 303, retrospectively up to what time point the results of detecting motion picture regions in the past will be used can be easily set and the mixing ratio of a video signal on which a motion picture process has been performed and a video signal on which a still image process has been processed in the transition region can be easily changed.

Embodiment 2

Figure 10:
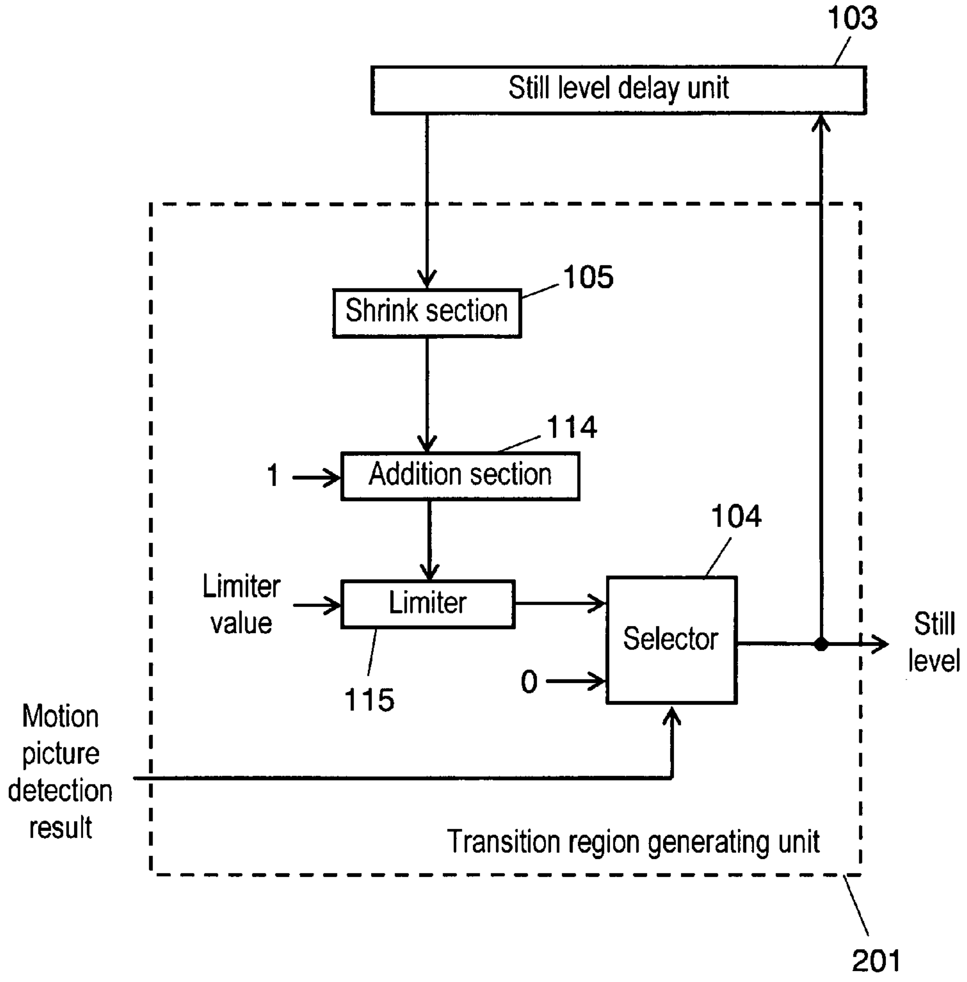
FIG. 10 is a block diagram showing an electrical configuration of a transition region generating unit of the plasma display apparatus according to embodiment 2 of the present invention.

FIG. 10 is a block diagram showing an electrical configuration of transition region generating unit 201 of the plasma display apparatus according to embodiment 2 of the present invention.

As shown in FIG. 10, transition region generating region 201 according to embodiment 2 of the present invention further includes shrink section 105 in addition to selector 104, addition section 114, and limiter 115 of transition region generating unit 200 according to embodiment 1 shown in FIG. 6. Hereinafter, shrink section 105 which is a newly added configuration element to transition region generating unit 201 will be described primarily.

When the "still level" output from "still level" delay unit 103 is smaller than the value of limiter in the limiter 115, that is when the maximal value of the "still level" is less than n, shrink section 105 shrinks the transition region which is formed by the "still level". To be more specific, when the "still level" of a pixel adjacent to the "still level" output from "still level" delay unit 103 is the maximal value n, shrink section 105 changes the read "still level" to the maximal value n. Accordingly, the transition region formed by a "still level" less than the maximal value is shrunk.

Hereinafter, the above-described operation will be described in detail with reference to drawings.

Figure 11:
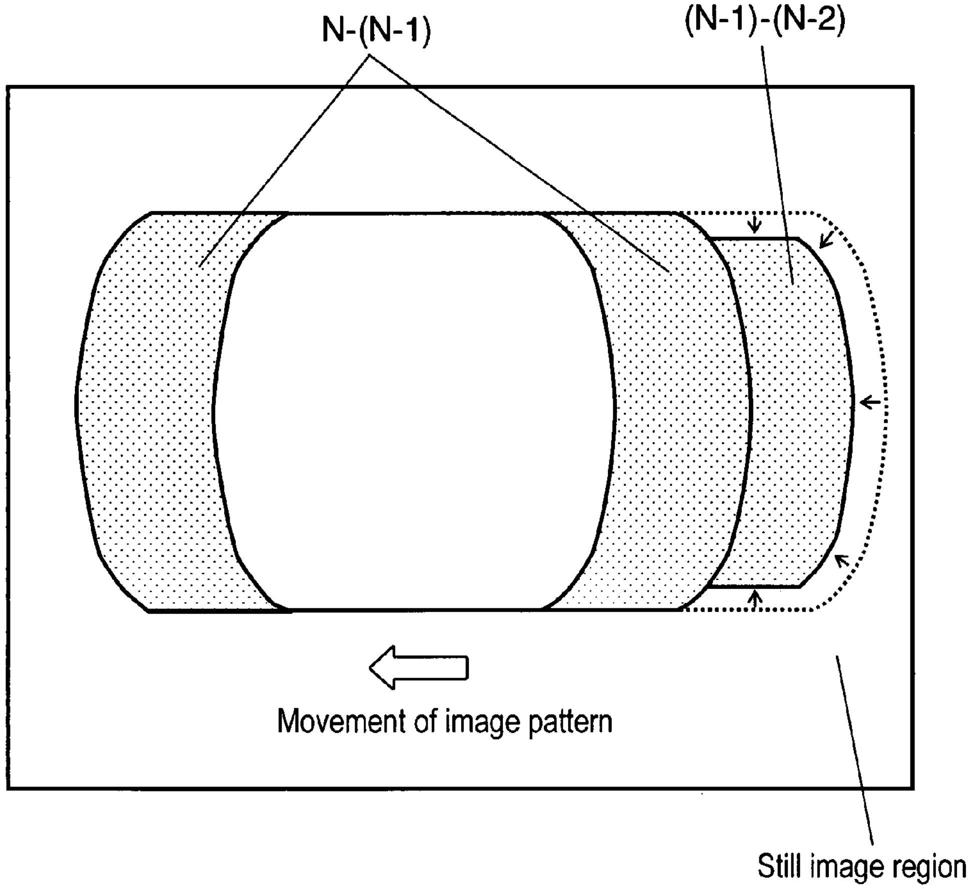
FIG. 11 is a schematic diagram showing a shrinking process of a transition region according to the embodiment 2 of the present invention.

FIG. 11 is a schematic diagram showing a shrinking process of a transition region according to embodiment 2 of the present invention.

Figure 12:
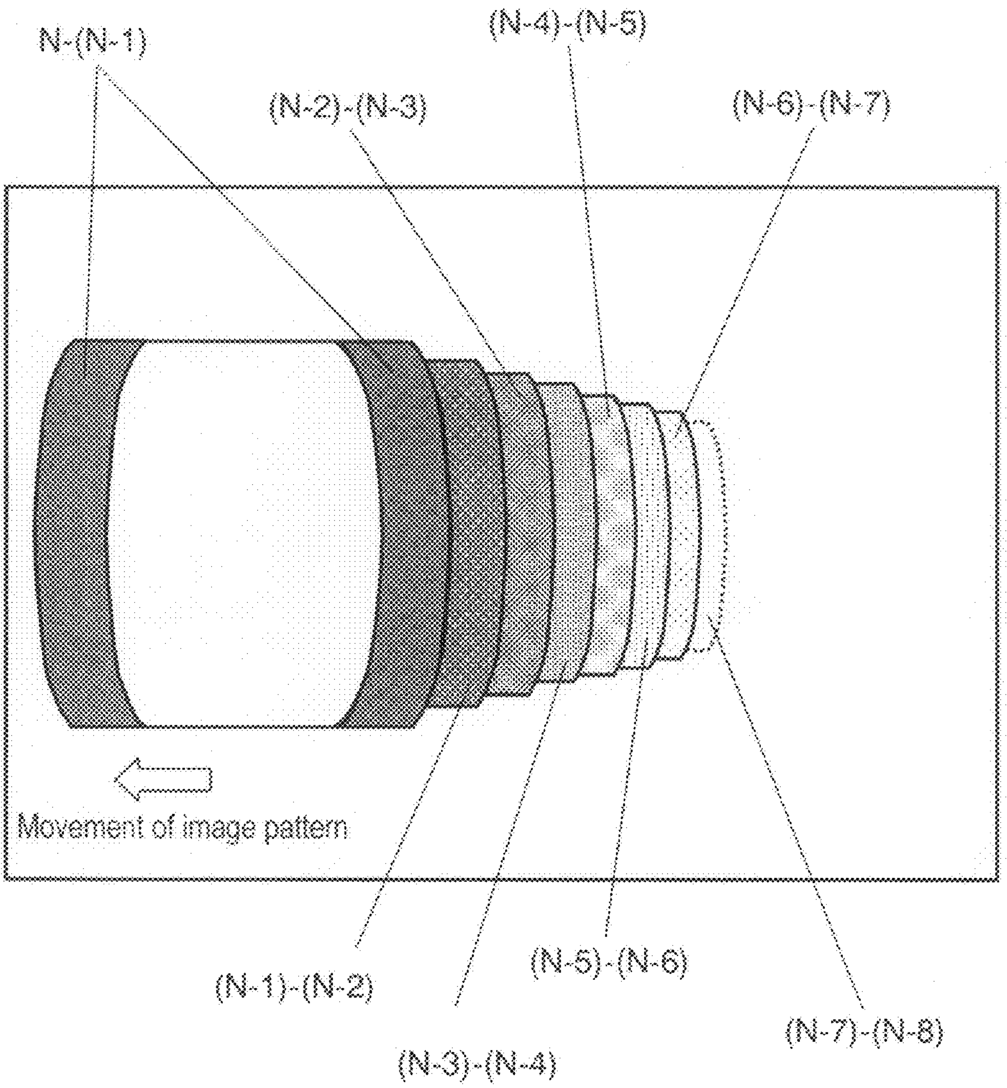
FIG. 12 is a schematic diagram showing consecutive shrinking processes of transition regions according to the embodiment 2 of the present invention.

For example, in a case where an image pattern shown in FIGS. 8A, 8B and 8C continuously moves with a constant amount of movement, a motion picture region denoted by N−(N−1) or (N−1)-(N−2) shown in FIG. 12 is detected. At this time, a motion picture region denoted by N−(N−1) which has been detected based on the difference between video signals of the current frame and a frame one frame before is a motion picture region detected by motion picture region detecting unit 102 and is not an output from still level delay unit 103. Accordingly, the shrink process of the motion picture region denoted by N−(N−1) is not performed. On the other hand, a region denoted by (N−1)-(N−2) which has been detected based on the difference between video signals of a frame before one frame and a frame before two frames is a transition region by a still level output from still level delay unit 103. Accordingly, in embodiment 2 of the present invention, the still level of a pixel which is in the boundary between the transition region and a still image region, that is, a region having a still level of the maximal value n is changed to the maximal value n, and accordingly, the transition region is shrunken by increasing the still image region.

FIG. 12 is a schematic diagram showing consecutive shrinking processes of transition regions according to embodiment 2 of the present invention.

For example, in a case where an image pattern shown in FIGS. 8A, 8B and 8C continuously moves with a constant amount of movement, when a shrinking process of the transition region is not performed, a motion picture region (transition region) denoted by N−(N−1) or (N−1)-(N−2) shown in FIG. 9 is detected, and areas of the transition regions become approximately the same. On the other hand, when consecutive shrinking processes of transition regions according to embodiment 2 of the present invention are performed, the operation of re-shrinking a transition region which is stored in still level delay unit 103 after being shrunk is repeatedly performed when it is output again from still level delay unit 103. Accordingly, the area of a transition region denoted by (N−1)-(N−2) which is detected based on the difference between the video signals of a frame one frame before and a frame two frames before becomes smaller than the area of a motion picture region denoted by N-(N−1) which is detected by the difference between video signals of the current frame and a frame one frame before. Likewise, the area of a transition region denoted by (N−2)-(N−3) becomes smaller than the area of a transition region denoted by (N−1)-(N−2), and the area of a transition region denoted by (N−3)-(N−4) becomes smaller than the area of a transition region denoted by (N−2)-(N−3). In this way, the longer time ago was a motion picture region detected, the more the transition region decreases. By the above-described shrinking process, the longer time ago was a motion picture region detected, the more a region on which a still image process is performed increases. In embodiment 2 of the present invention, by using the above-described technique, the boundary between a motion picture region and a still image region becomes smoother to further decrease the switching shock, and accordingly, it becomes possible to display a motion picture more smoothly.

In embodiment 2 of the present invention, a configuration in which when a still level of a pixel adjacent to a still level less than a maximal value n is the maximal value n, the still level less than the maximal value n is changed to the maximal value n was described above. However, the present invention is not limited thereto, and when a still level of a pixel adjacent to a still image region (a pixel having a maximal value n as a still level) within a predetermined number of pixels, for example, two pixels or three pixels, is configured to be changed to the maximal value n, the degree of shrinking a transition region may be changed by setting the predetermined number of pixels.

In the above-described embodiments of the present invention, a configuration in which the maximal value of a random number generated by random number generating part 303 is set to a value resulting from subtracting one from the value of the limiter in limiter 115, that is, a value resulting from subtracting one from the maximal value of the "still level", and when the "still level" is greater than a random number generated by random number generating part 303, comparison part 304 outputs a signal for selecting a video signal on which a still image process has been performed as a selection signal was described. However, for example, when a configuration in which a maximal value of random numbers generated by random number generating part 303 is set to a value the same as the value of the limiter in limiter 115, that is, a maximal value of a "still level" and comparison part 304 outputs a signal for selecting a video signal on which a still image process has been performed when the "still level" output from transition region generating unit 200 is equal to or greater than a random number generated by random number generating part 303 is used, the operations equivalent to the above-described operations can be performed.

In the embodiments of the present invention, a configuration in which selector 104 selects "0" in a region which is determined to be a motion picture region detecting unit 102 and a "still level" is set to "0" was described. However, the present invention is not limited thereto, and in that case, a configuration in which a number other than "0", for example, "−1" may be set may be used. When the initial value of the "still level" is set to "−1", a "still level" delayed by one frame by still level delay unit 103 becomes "0", and accordingly, motion picture processes are performed on all the video signals in a motion picture region detected based on a difference between video signals of a frame one frame before and a frame two frames before as well as in a motion picture region detected based on a difference between video signals of the current frame and a frame before one frame. In this case, from a motion picture region detected based on the difference between video signals of a frame before two frames and a frame before three frames becomes a transition region in which a signal on which a motion picture process is to be performed and a signal on which a still image process is to be performed are mixedly included. As described above, by setting the initial value of the still level, which is set by selector 104, other than "0", it becomes possible to arbitrary set a frame from which a motion picture region becomes a transition region.

In the embodiments of the present invention, although a configuration in which a motion picture region is detected by detecting a difference of video signals between frames and the still level is delayed by units of one frame is described, but, for example, a configuration in which the above-described process is performed in units of fields may be used.

In the embodiments of the present invention, a configuration in which limiter 115 is prepared in transition region generating regions 200 and 201 was described, but, for example, a same effect can be acquired by limiting the range of random numbers generated by random number generating part 303 without preparing limiter 115.

In the embodiments of the present invention, the maximal value of the "still level" was described to be "7", but this is only an example, and it is preferable that the maximal value of the "still level" is set to an optimal value based on characteristics of a display device or a configuration of specification of a circuit.

In the above-described embodiments, a case where a PDP, as an example, was used was described, but the present invention may be applied to any image display method which performs multi-gradation display by dividing one field of an image into a plurality of subfields of images using the same method, and the above-described advantage can be acquired.

INDUSTRIAL APPLICABILITY

Since an image display apparatus according to an embodiment of the present invention can reduce a dynamic false contour and decrease in the switching shock which occurs in the boundary of a motion picture region and a still image region by including a video signal on which a motion picture process has been performed and a video signal on which a still image process has been performed together in the boundary between the motion picture region and the still image region to improve the image quality in displaying a motion picture, the image display apparatus is useful for an image display apparatus such as a PDP or a DMD which performs multi-gradation display by dividing one field of an image into a plurality of subfields of images.

The invention claimed is:

1. A video signal processing apparatus used for an image display apparatus which constructs one field as a plurality of subfields having different luminance weightings and displays multi-gradations by controlling light-emitting or non light-emitting of each subfield, the video signal processing apparatus comprising:

- a motion picture region detecting unit which detects a motion picture region from a video signal;
- a still image processing unit which performs a still image process on the video signal;
- a motion picture processing unit which performs a motion picture process on the video signal, the motion picture process including a conversion of a gradation level of the video signal;
- a transition region generating unit that generates a still level for selecting a video signal on which the still image process has been performed or a video signal on which the motion picture process has been performed based on the result of the detection of the motion picture region detecting unit, the still level being a numerical value;
- a selection unit that selects the video signal on which the still image process has been performed or the video signal on which the motion picture process has been performed; and a still level delay unit which outputs the still level output from the transition region generating unit with a delay by one frame period;

wherein the transition region generating unit adds a predetermined correction value to the delayed still level output from the still level delay unit so as to generate a corrected value, limits the corrected value by a predetermined limiter value, outputs an initial value set in advance as the still level in the motion picture region, and outputs a value limited by the predetermined limiter value as the still level in a region other than the motion picture region; and wherein the selection unit includes a random number generating part, a comparison part, and a selector, and the random number generating part generates a random number, the comparison part compares a value of the generated random number to the value of the still level output by the transition region generating unit, and outputs a selection signal based on a result of the comparison, and the selector selects the video signal on which the still image process has been performed or the video signal on which the motion picture process has been performed based on the selection signal output by the comparison part, and outputs the selected video signal, wherein the motion picture region detecting unit detects a first motion picture region which precedes a current frame by a first amount of time, and a second motion picture region which precedes the current frame by a second amount of time, the second amount of time being greater than the first amount of time, and wherein the still level generated by the transition region generating unit for the second motion picture region is greater than the still level generated by the transition region generating unit for the first motion picture region.

2. The video signal processing apparatus of claim 1, wherein the initial value in the transition region generating unit is set to zero and the correction value is set to one, and wherein the selection unit selects the video signal on which the still image process has been performed when the still level is greater than the random number generated by the random number generating part, and the selection unit selects the video signal on which the motion picture process has been performed to be output when the still level is equal to or smaller than the random number generated by the random number generating part.

3. The video signal processing apparatus of claim 1, further comprising a shrink unit which changes the still level of an arbitrary pixel to a maximal value when the still level of a pixel adjacent to the arbitrary pixel in the region other than the motion picture region is the maximal value.

4. A video signal processing method used for an image display apparatus which constructs one field as a plurality of subfields having different luminance weightings and displays multi-gradations by controlling light-emitting or non light-emitting of each subfield, the video signal processing method comprising the steps of:

detecting a motion picture region from a video signal;

generating a still level for selecting a video signal on which a still image process has been performed or a video signal on which a motion picture process has been performed based on the result of the detection of the motion picture region, the motion picture process including a conversion of a gradation level of the video signal, and the still level being a numerical value;

selecting the video signal on which the still image process has been performed or the video signal on which the motion picture process has been performed; and delaying the still level generated during the step of generating a still level by one frame period;

wherein, in the step of generating a still level, a predetermined correction value is added to the delayed still level generated in the step of delaying a still level so as to generate a corrected value, the corrected value is limited by a predetermined limiter value, an initial value set in advance is output as the still level in the motion picture region, and a value limited by the predetermined limiter value is output as the still level in a region other than the motion picture region, wherein, in the step of selecting, a random number is generated, a value of the generated random number is compared to the value of the still level output in the step of generating a still level, and a selection signal is output based on a result of the comparison, and one of the video signal on which the still image process has been performed or the video signal on which the motion picture process has been performed is selected based on the selection signal, and the selected video signal is output, wherein, in the step of detecting a motion picture region, a first motion picture region is detected which precedes a current frame by a first amount of time, and a second motion picture region is detected which precedes the current frame by a second amount of time, the second amount of time being greater than the first amount of time, and wherein, in the step of generating a still level, the still level generated for the second motion picture region is greater than the still level generated for the first motion picture region.

* * * * *